(No Model.) 23 Sheets—Sheet 1.
S. WILE & H. LACASSE.
MACHINE FOR CORKING BOTTLES AND WIRING THE CORKS THEREIN.
No. 443,185. Patented Dec. 23, 1890.
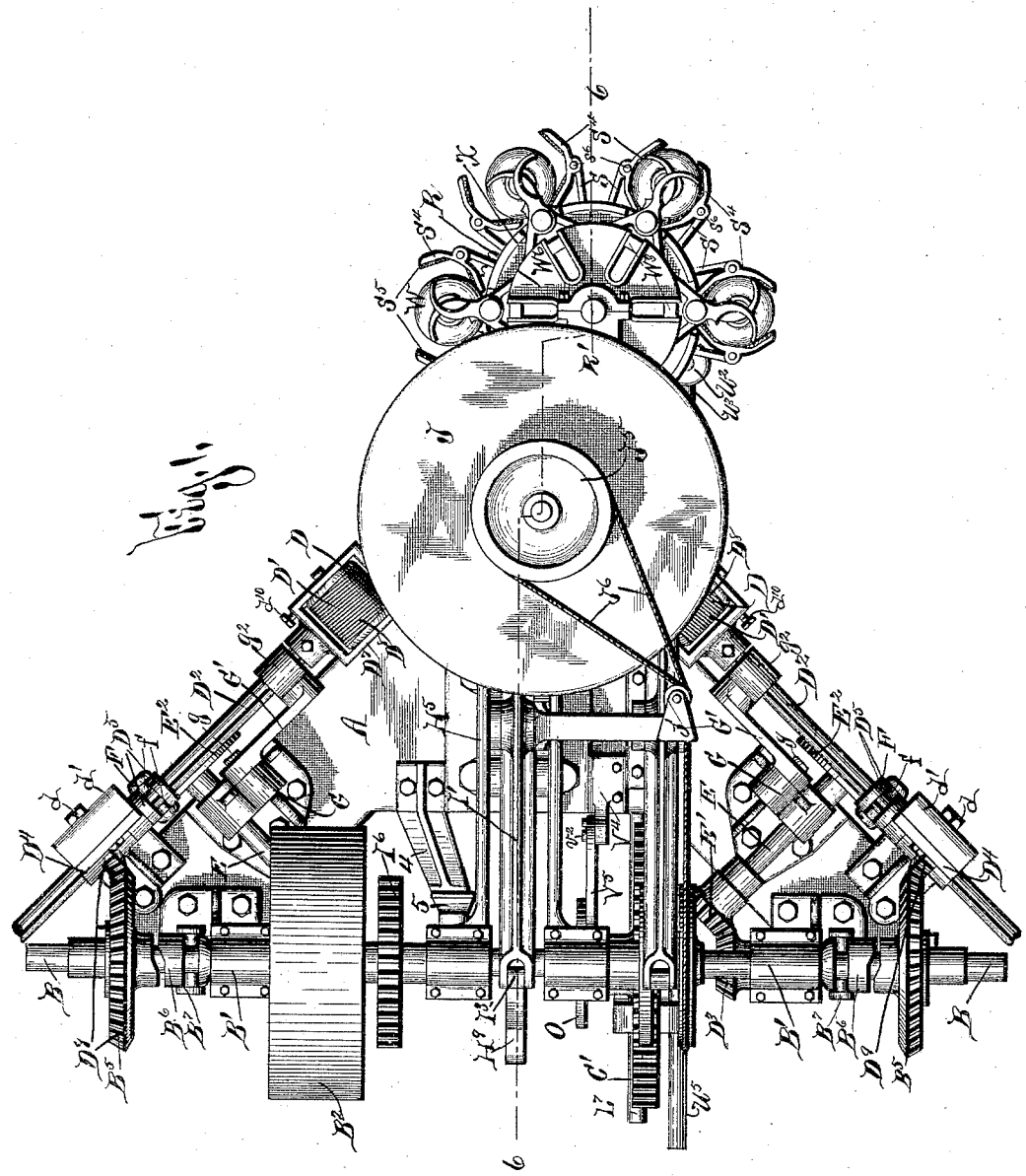
WITNESSES:
INVENTORS
Sol Wile & Henry LaCasse
BY George H. Hey
ATTORNEY.

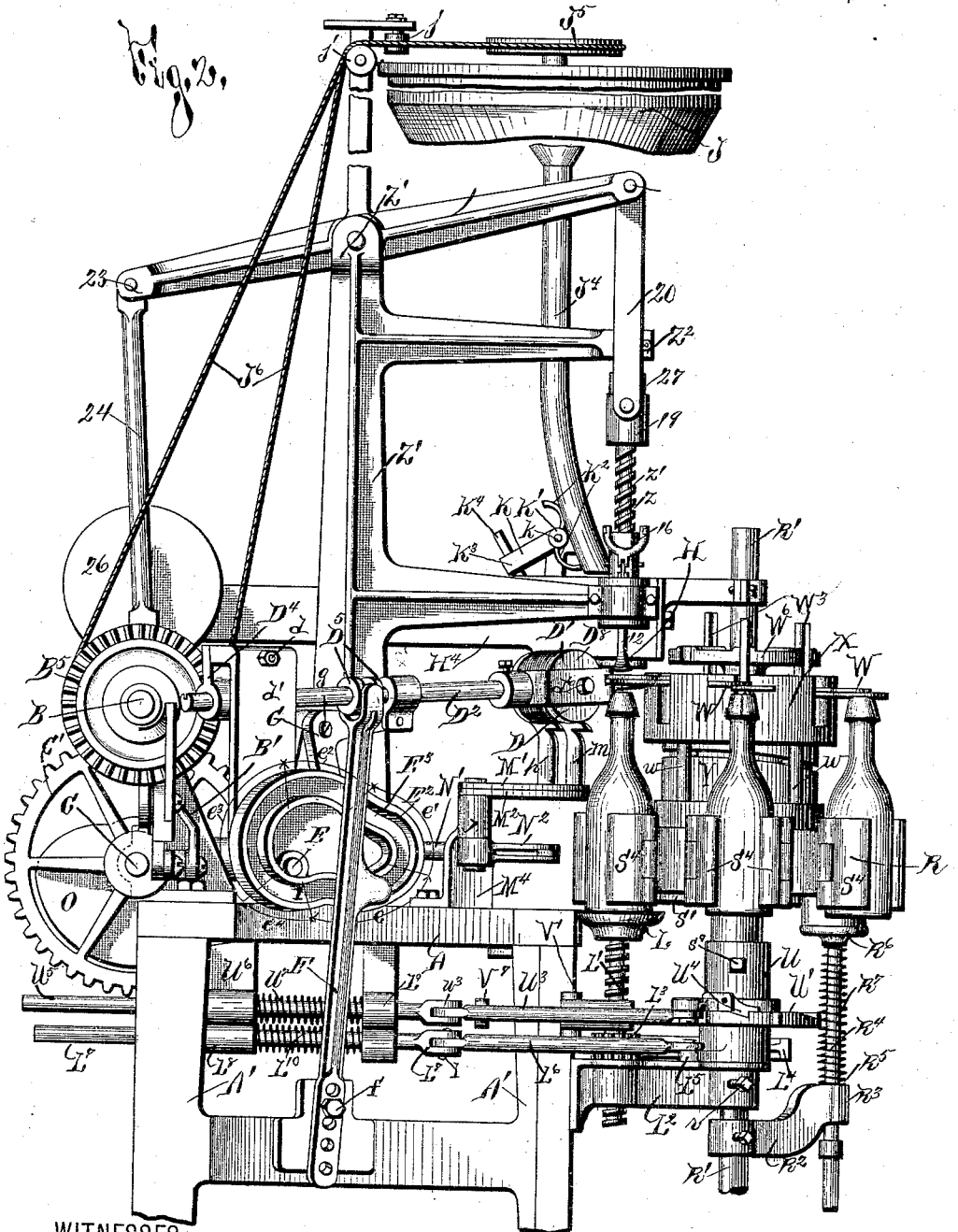

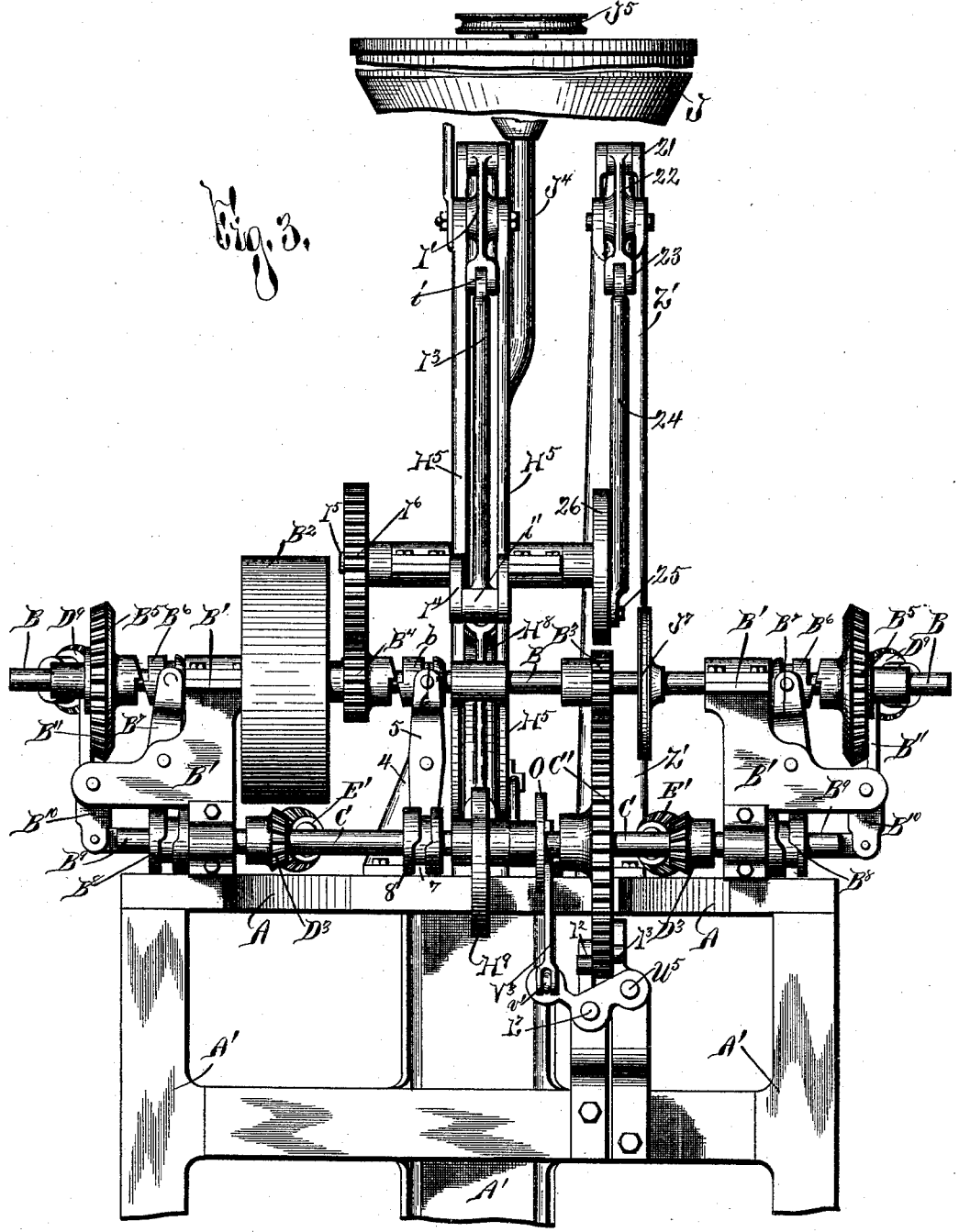

(No Model.)  23 Sheets—Sheet 4.
S. WILE & H. LACASSE.
MACHINE FOR CORKING BOTTLES AND WIRING THE CORKS THEREIN.
No. 443,185. Patented Dec. 23, 1890.
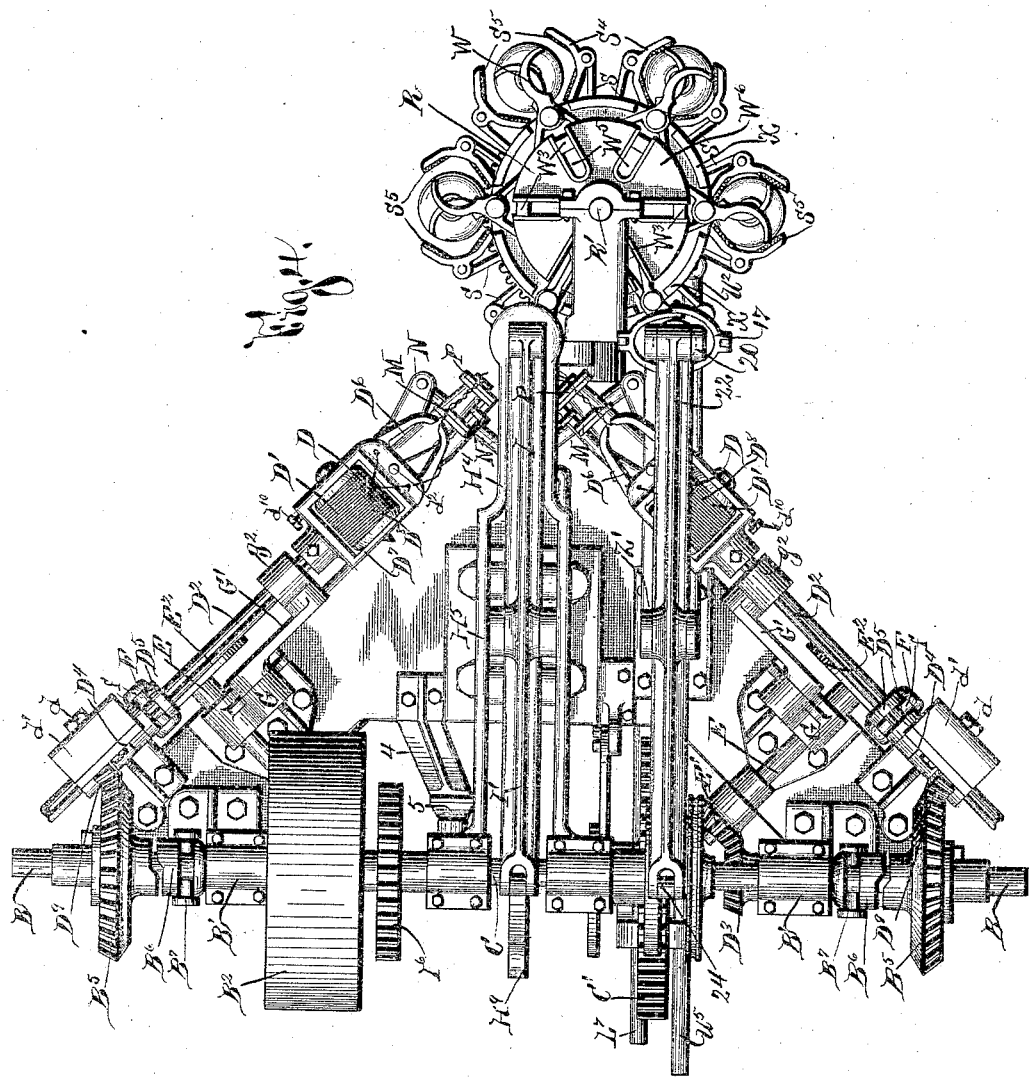

(No Model.)  23 Sheets—Sheet 5.
S. WILE & H. LACASSE.
MACHINE FOR CORKING BOTTLES AND WIRING THE CORKS THEREIN.
No. 443,185. Patented Dec. 23, 1890.
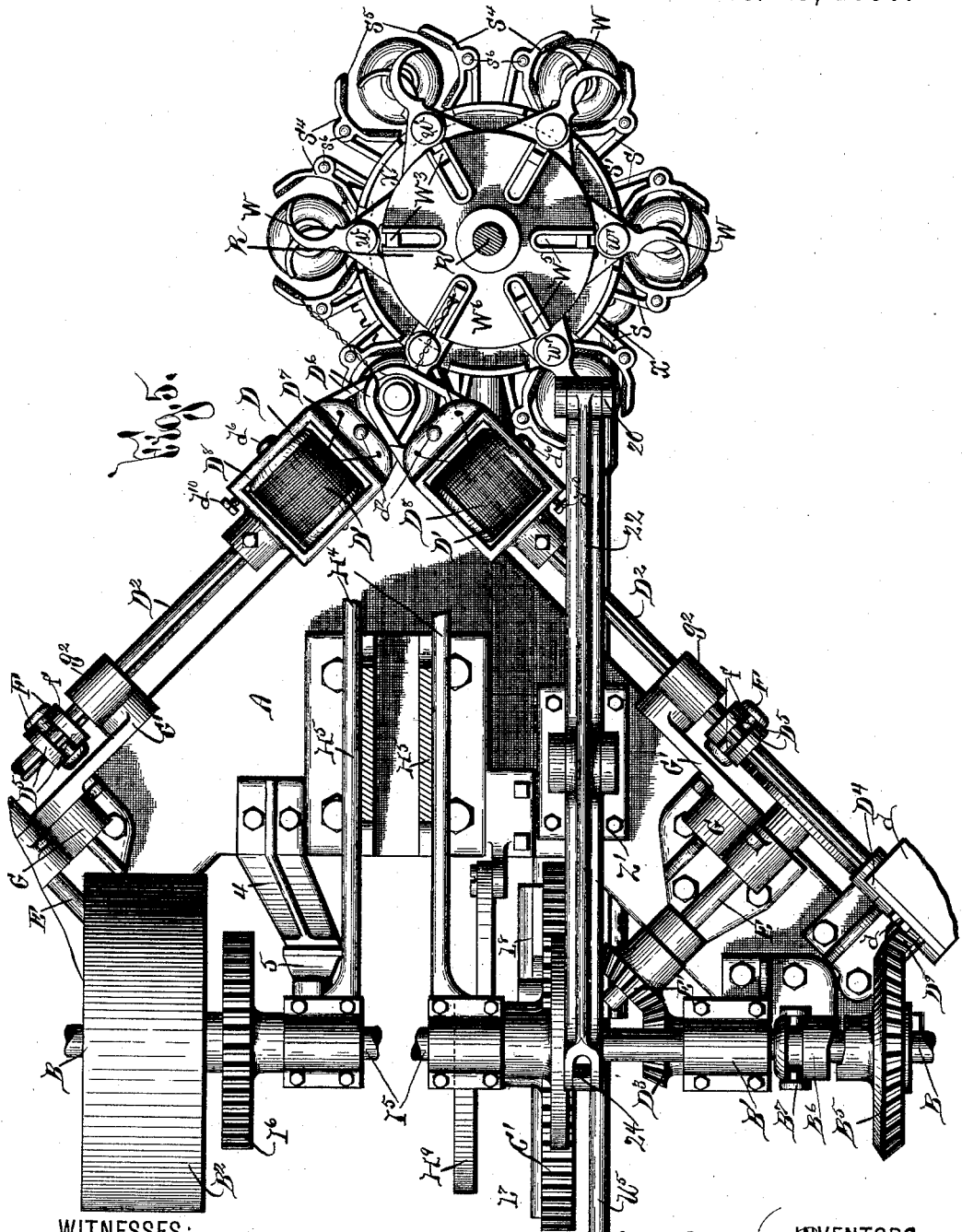

(No Model.) 23 Sheets—Sheet 6.
S. WILE & H. LACASSE.
MACHINE FOR CORKING BOTTLES AND WIRING THE CORKS THEREIN.
No. 443,185. Patented Dec. 23, 1890.
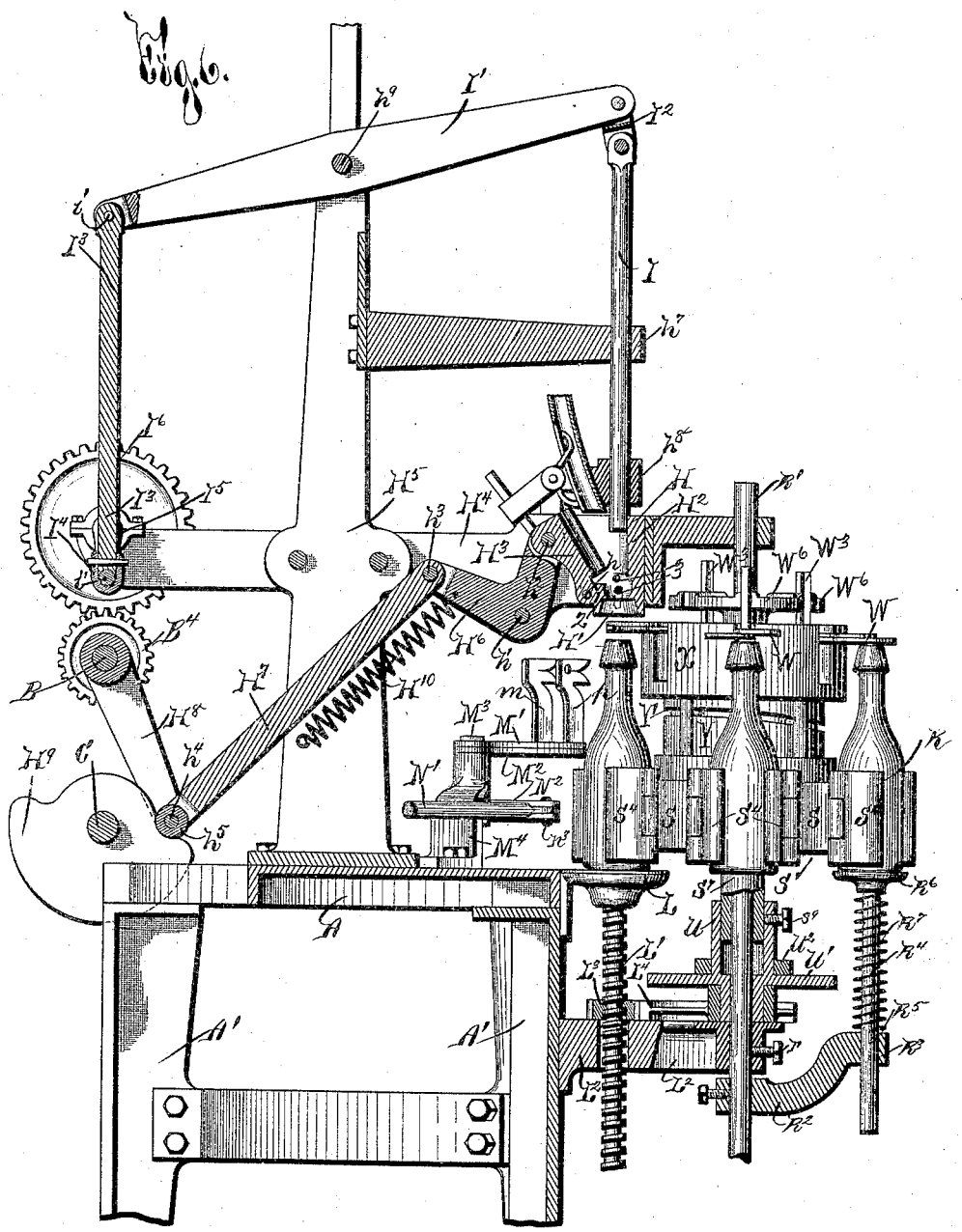

(No Model.) 23 Sheets—Sheet 7.
S. WILE & H. LACASSE.
MACHINE FOR CORKING BOTTLES AND WIRING THE CORKS THEREIN.
No. 443,185. Patented Dec. 23, 1890.
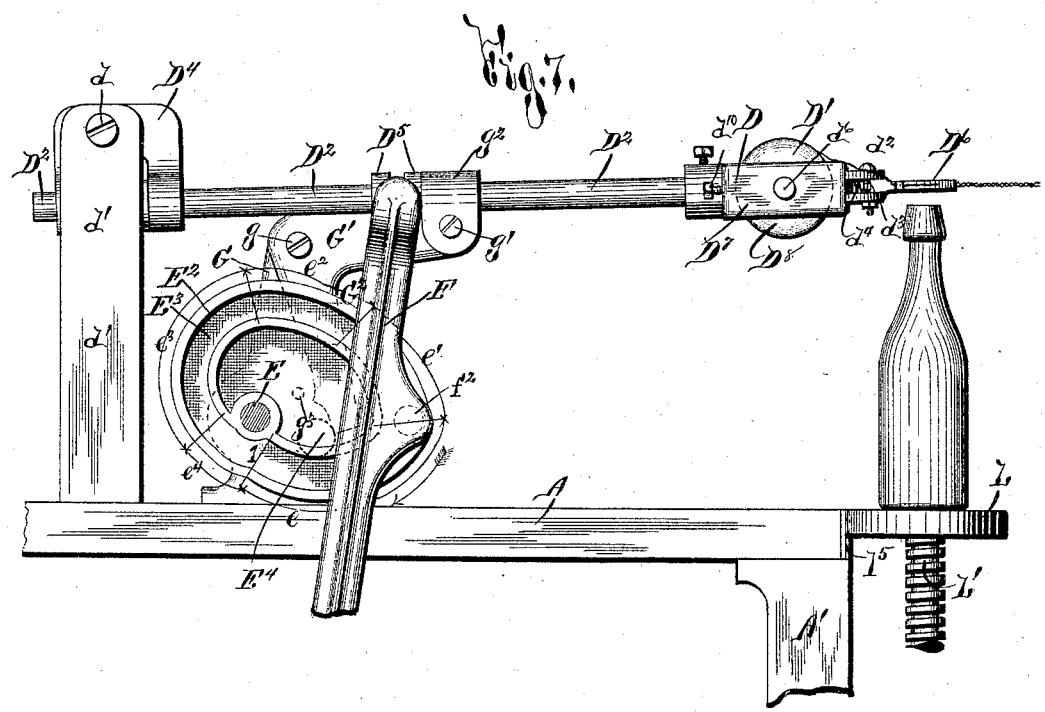
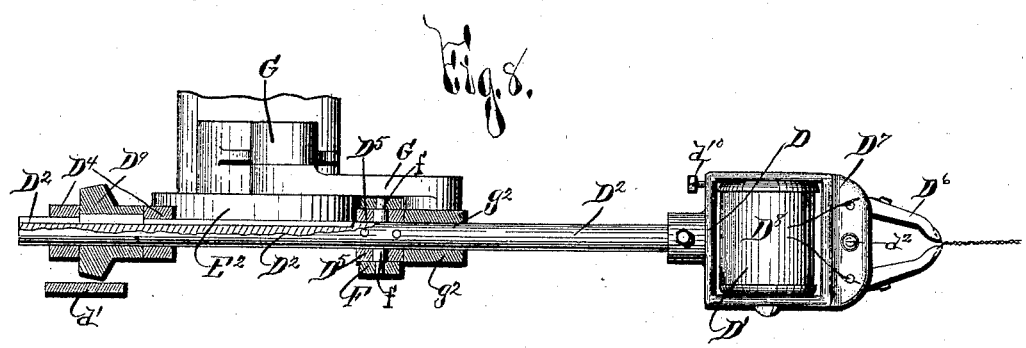
WITNESSES: INVENTORS
BY
ATTORNEY.

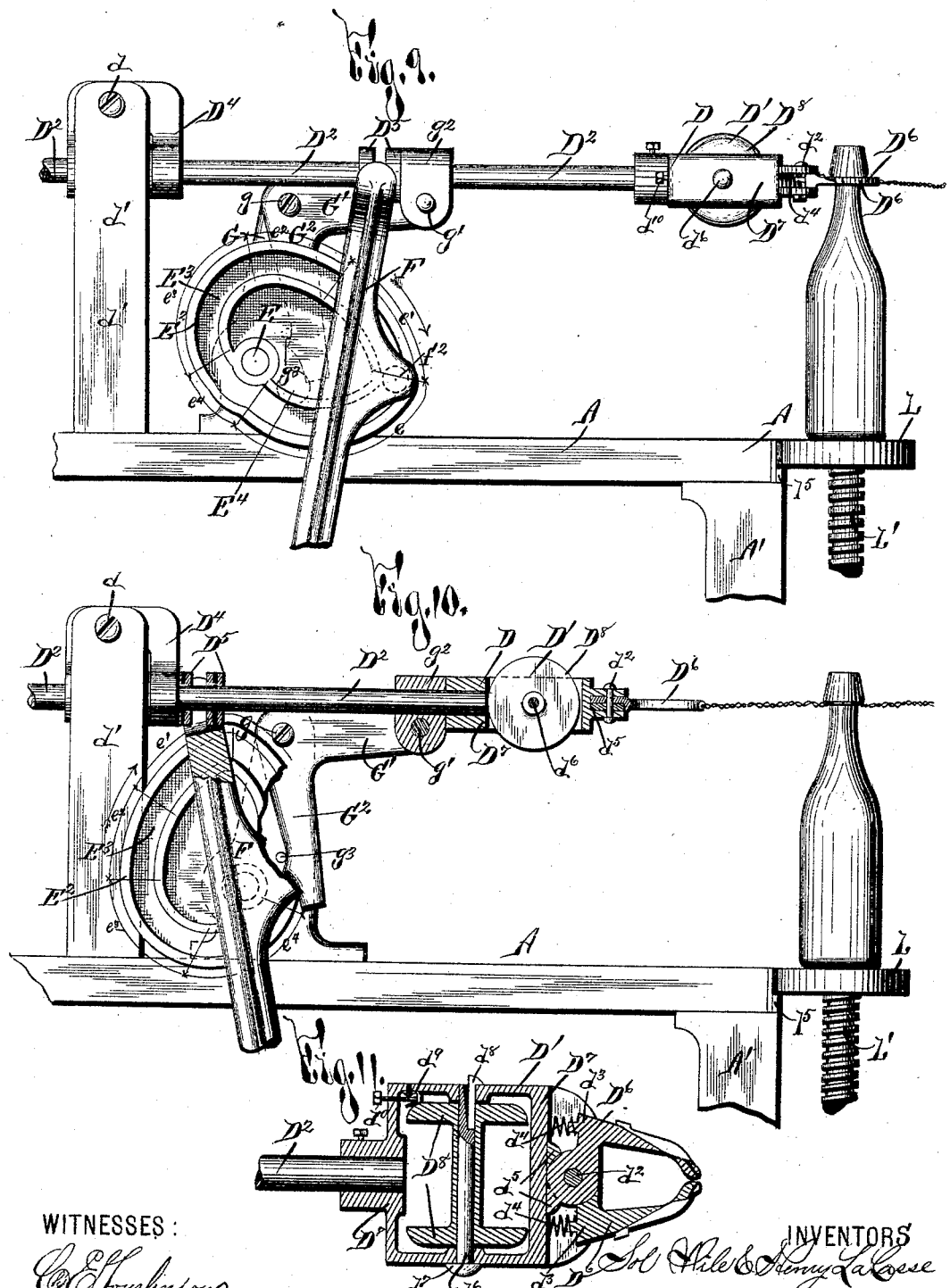

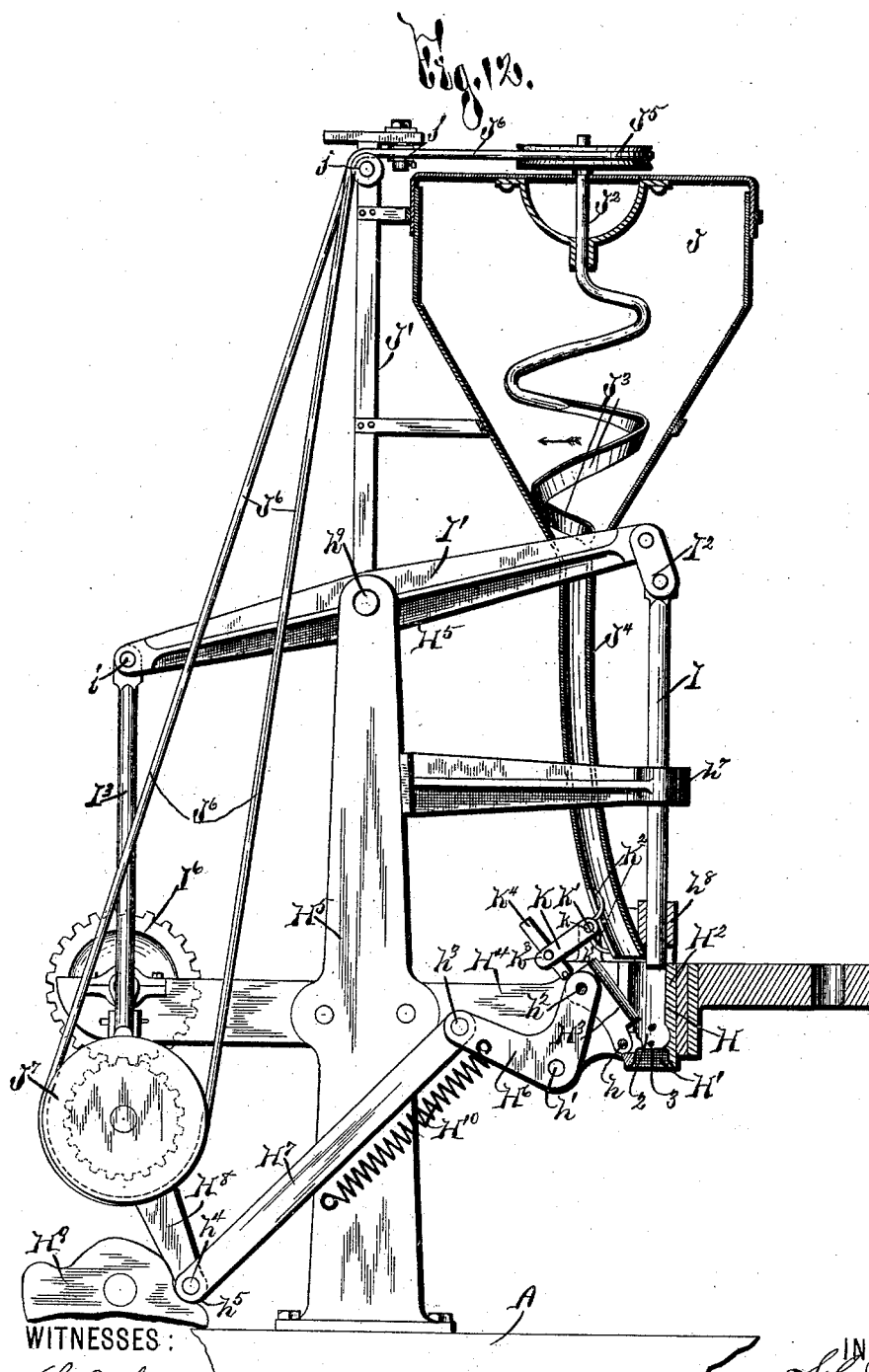

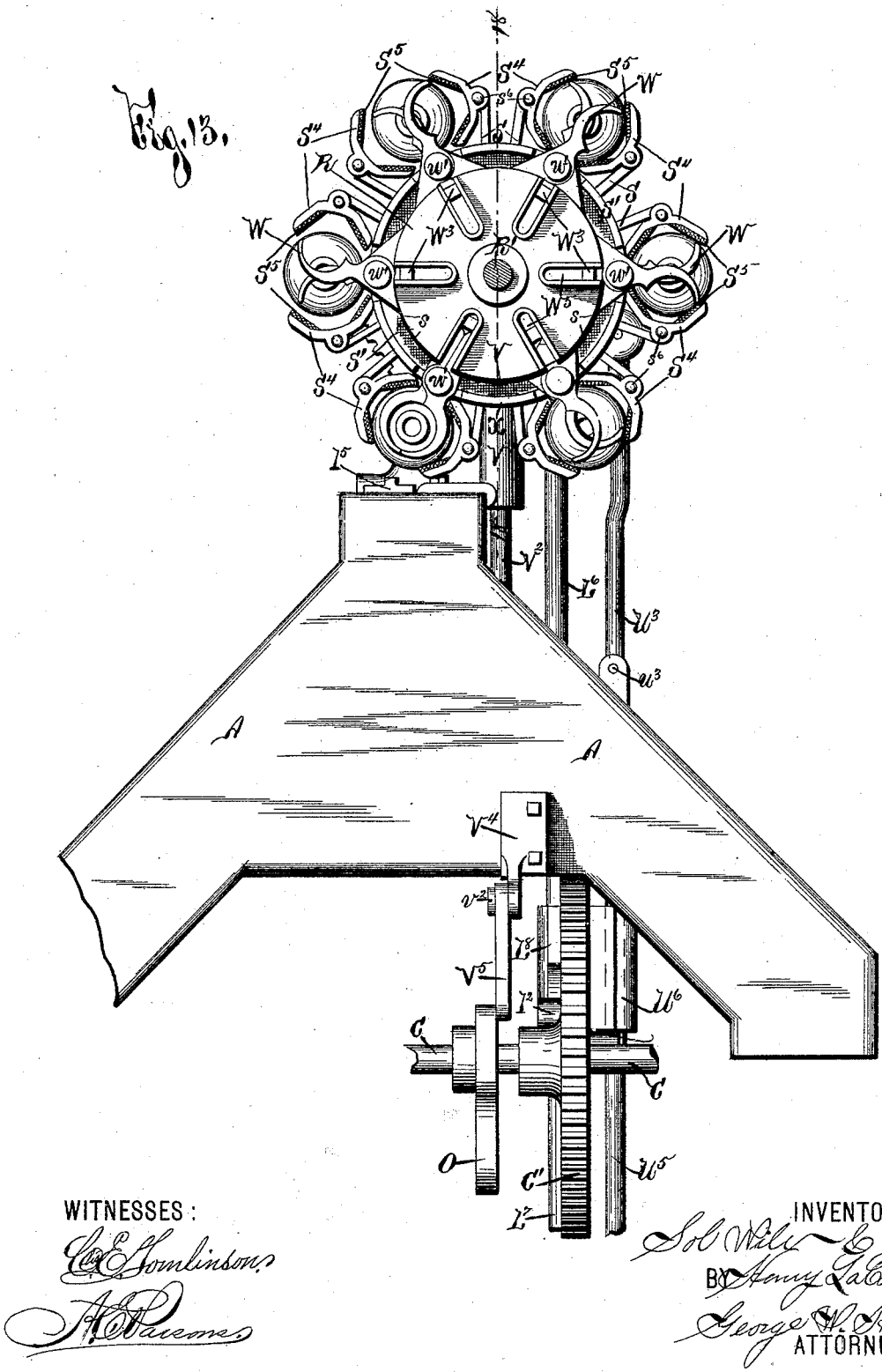

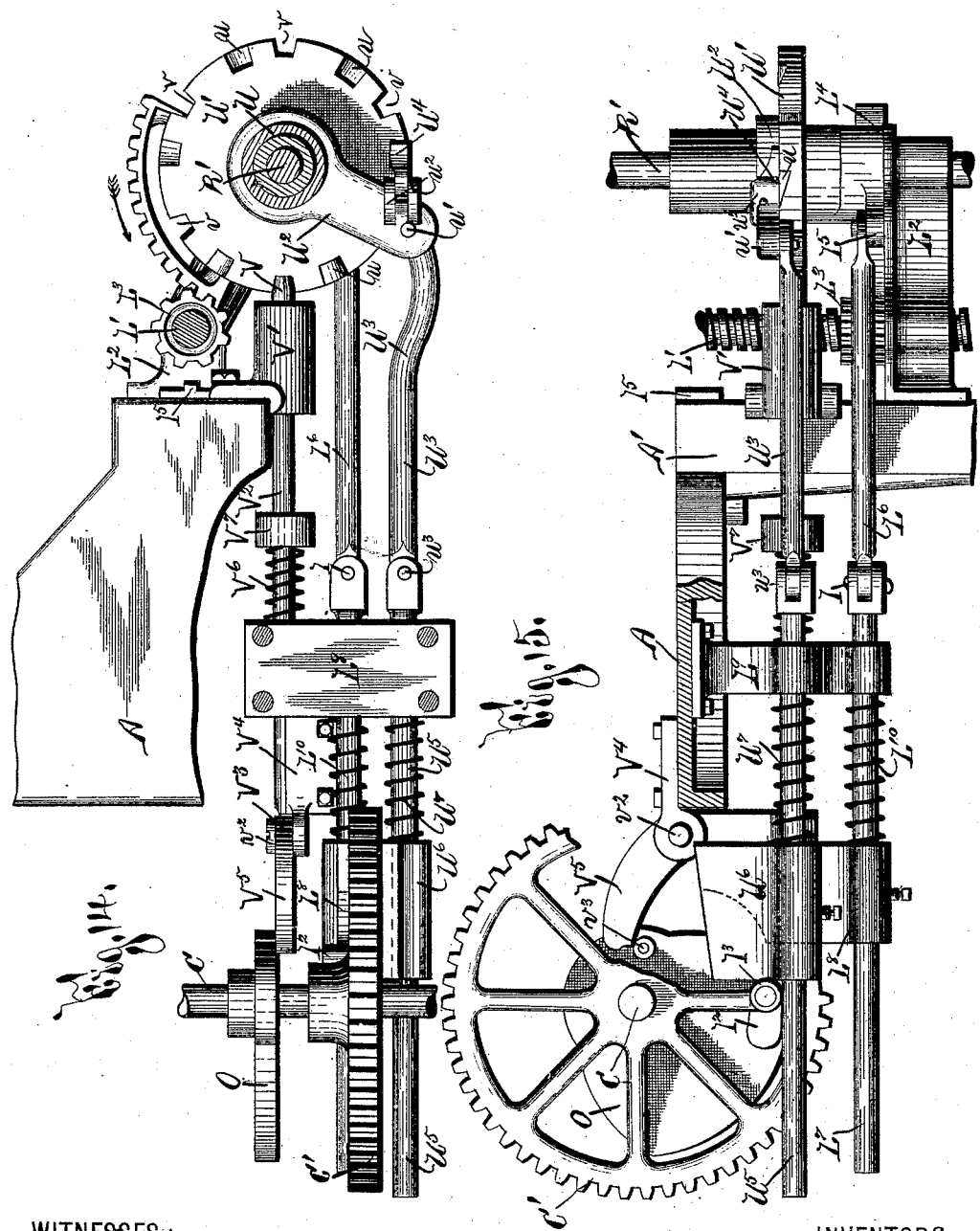

(No Model.) 23 Sheets—Sheet 12.
S. WILE & H. LACASSE.
MACHINE FOR CORKING BOTTLES AND WIRING THE CORKS THEREIN.
No. 443,185. Patented Dec. 23, 1890.
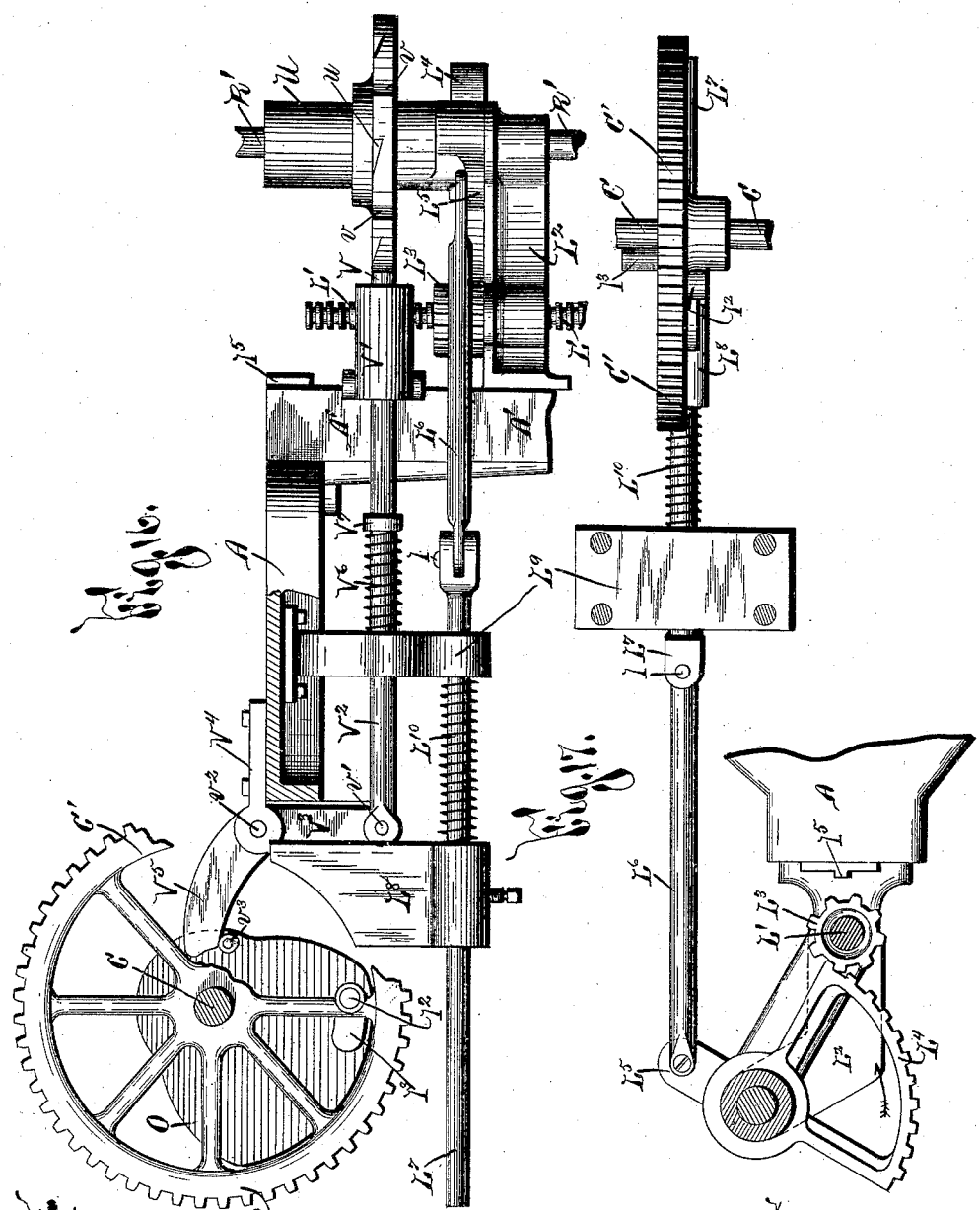
Witnesses.
H. E. Chase,
Inventors.
Sol Wile & Henry Lacasse
by George
Attorney.

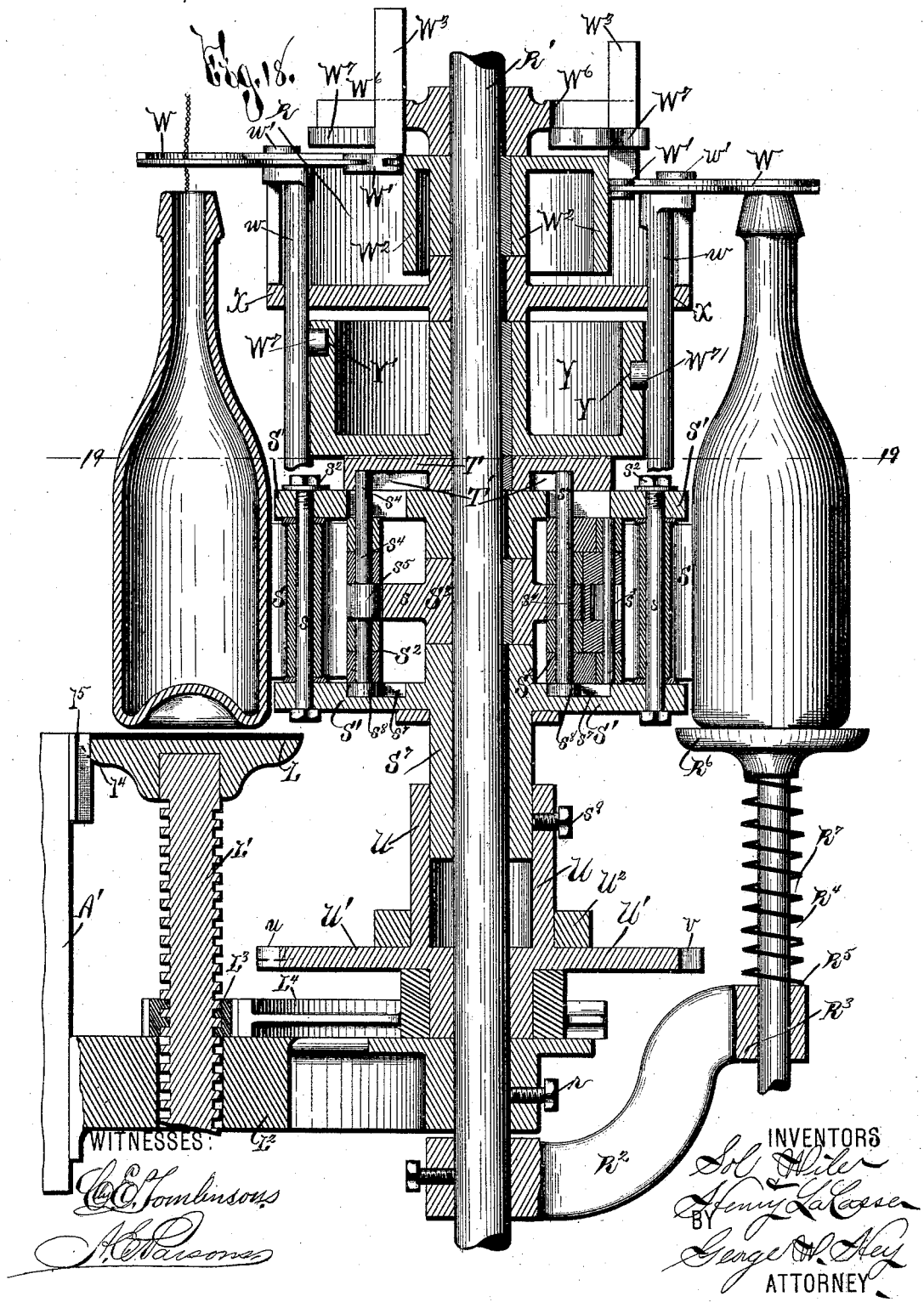

(No Model.) 23 Sheets—Sheet 14.
S. WILE & H. LACASSE.
MACHINE FOR CORKING BOTTLES AND WIRING THE CORKS THEREIN.
No. 443,185. Patented Dec. 23, 1890.
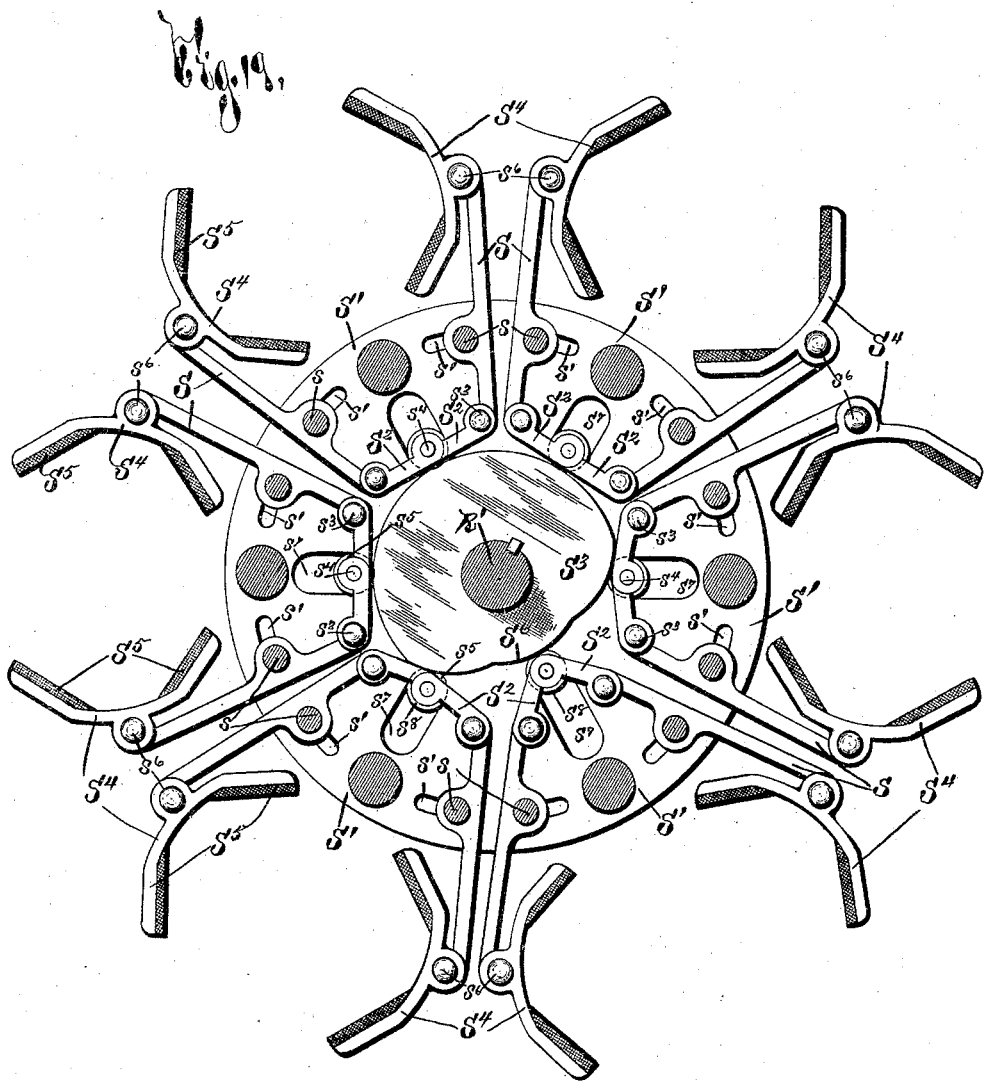

(No Model.) 23 Sheets—Sheet 15.
S. WILE & H. LACASSE.
MACHINE FOR CORKING BOTTLES AND WIRING THE CORKS THEREIN.
No. 443,185. Patented Dec. 23, 1890.
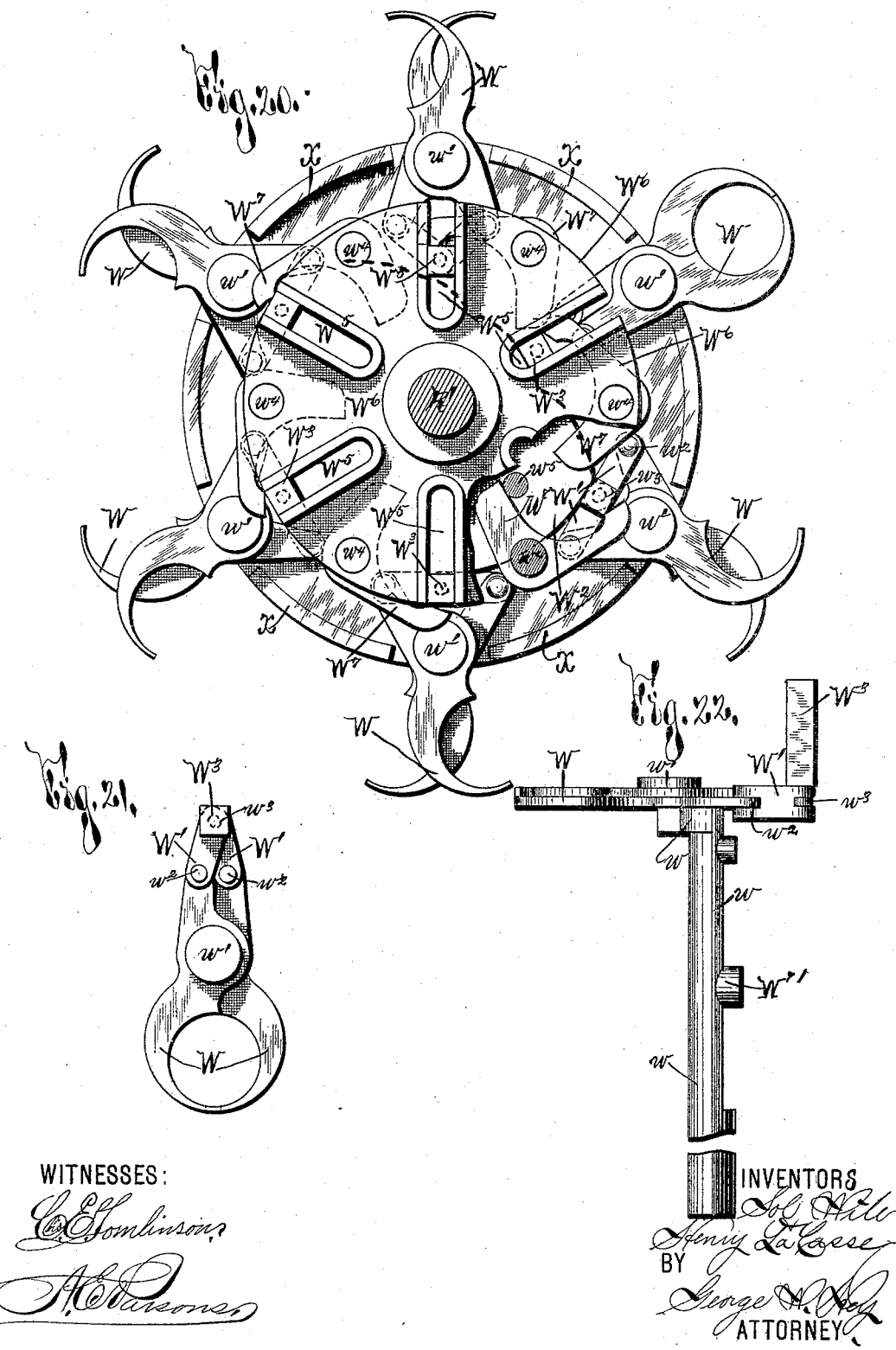

(No Model.) 23 Sheets—Sheet 16.
S. WILE & H. LACASSE.
MACHINE FOR CORKING BOTTLES AND WIRING THE CORKS THEREIN.
No. 443,185. Patented Dec. 23, 1890.
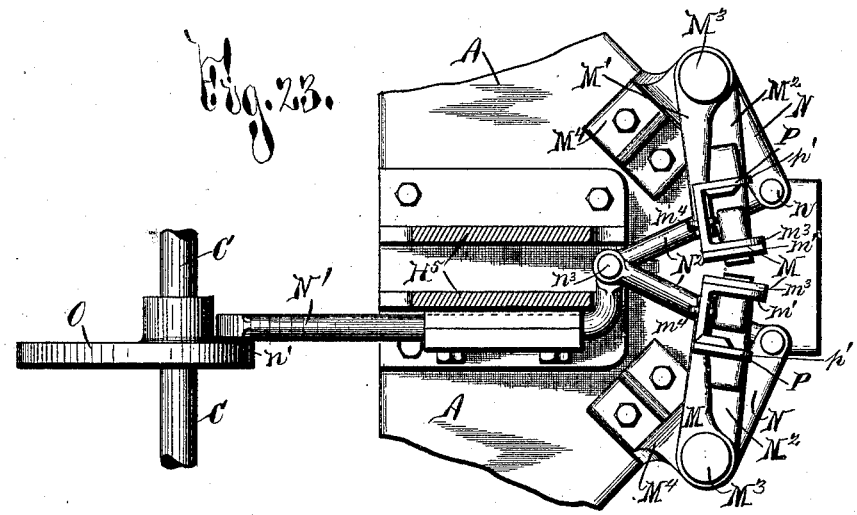
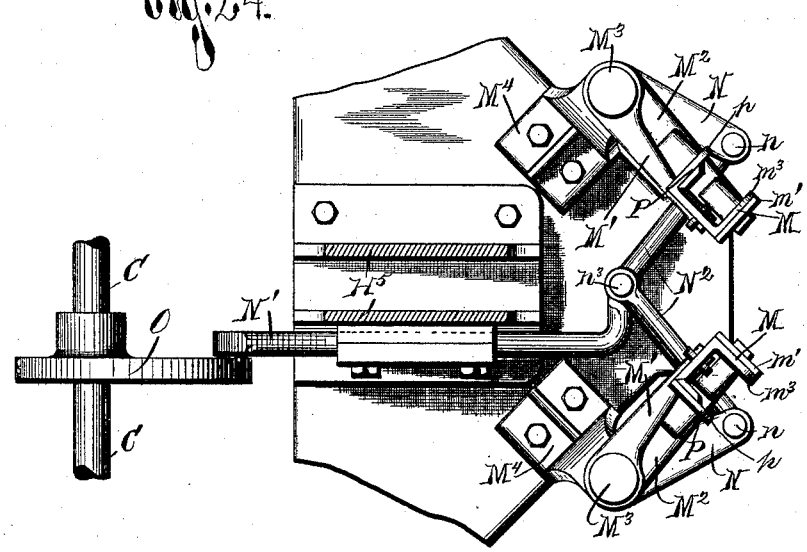
WITNESSES:
INVENTORS
Sol Wile & Henry Lacasse
BY George W. Hey
ATTORNEY (No Model.) 23 Sheets—Sheet 17.
S. WILE & H. LACASSE.
MACHINE FOR CORKING BOTTLES AND WIRING THE CORKS THEREIN.
No. 443,185. Patented Dec. 23, 1890.
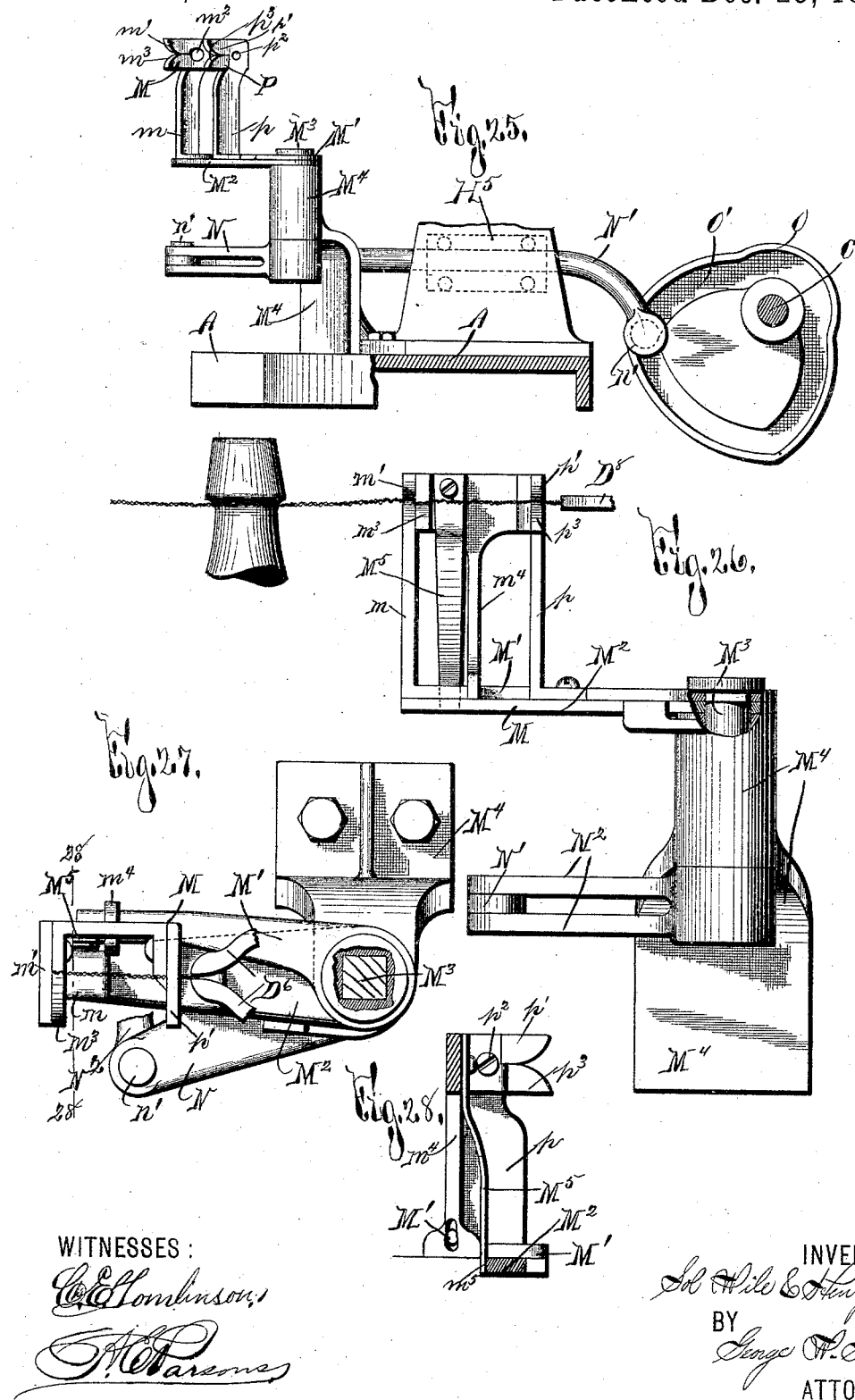
WITNESSES:
INVENTORS
BY
ATTORNEY (No Model.) 23 Sheets—Sheet 18.
S. WILE & H. LACASSE.
MACHINE FOR CORKING BOTTLES AND WIRING THE CORKS THEREIN.
No. 443,185. Patented Dec. 23, 1890.
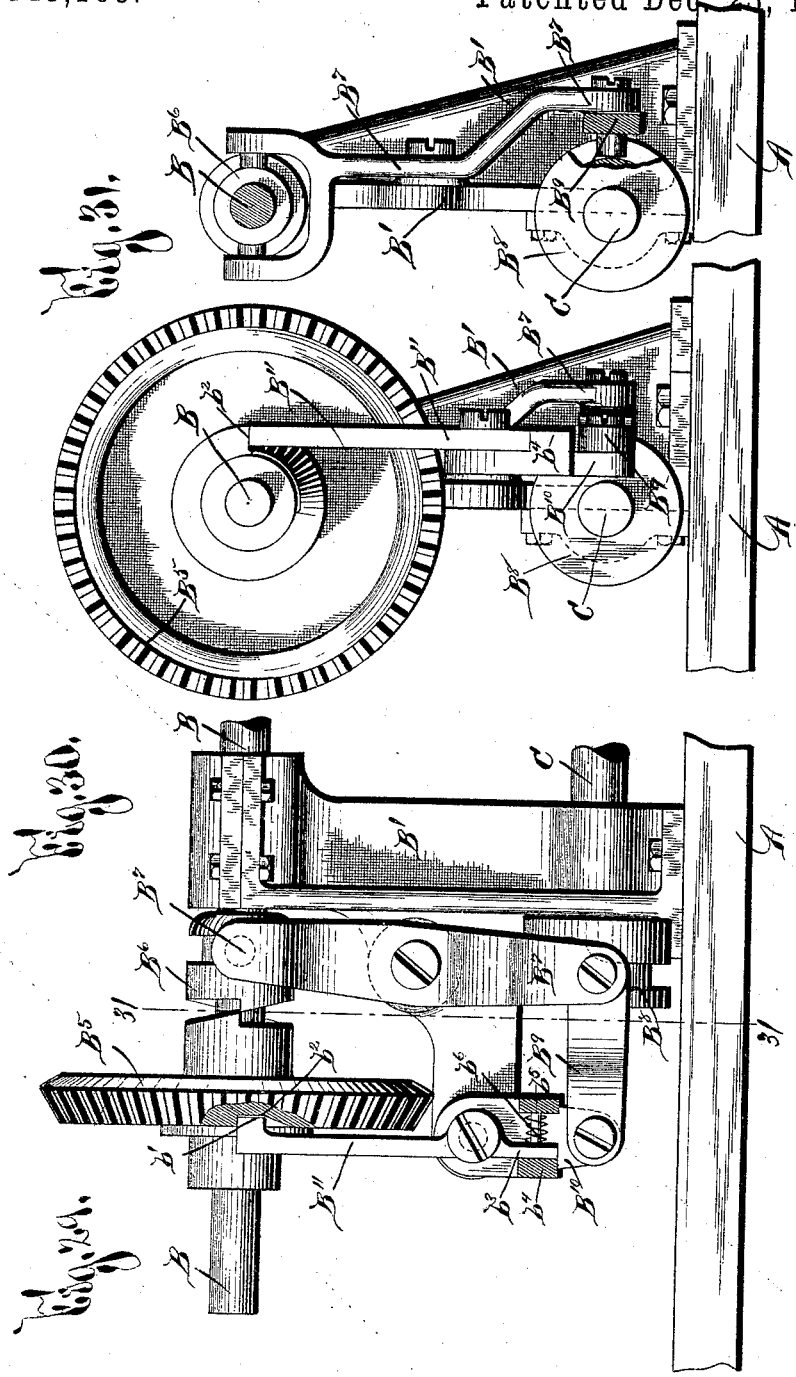
WITNESSES:
INVENTORS
BY
ATTORNEY (No Model.)
S. WILE & H. LACASSE.
MACHINE FOR CORKING BOTTLES AND WIRING THE CORKS THEREIN.
No. 443,185. Patented Dec. 23, 1890.
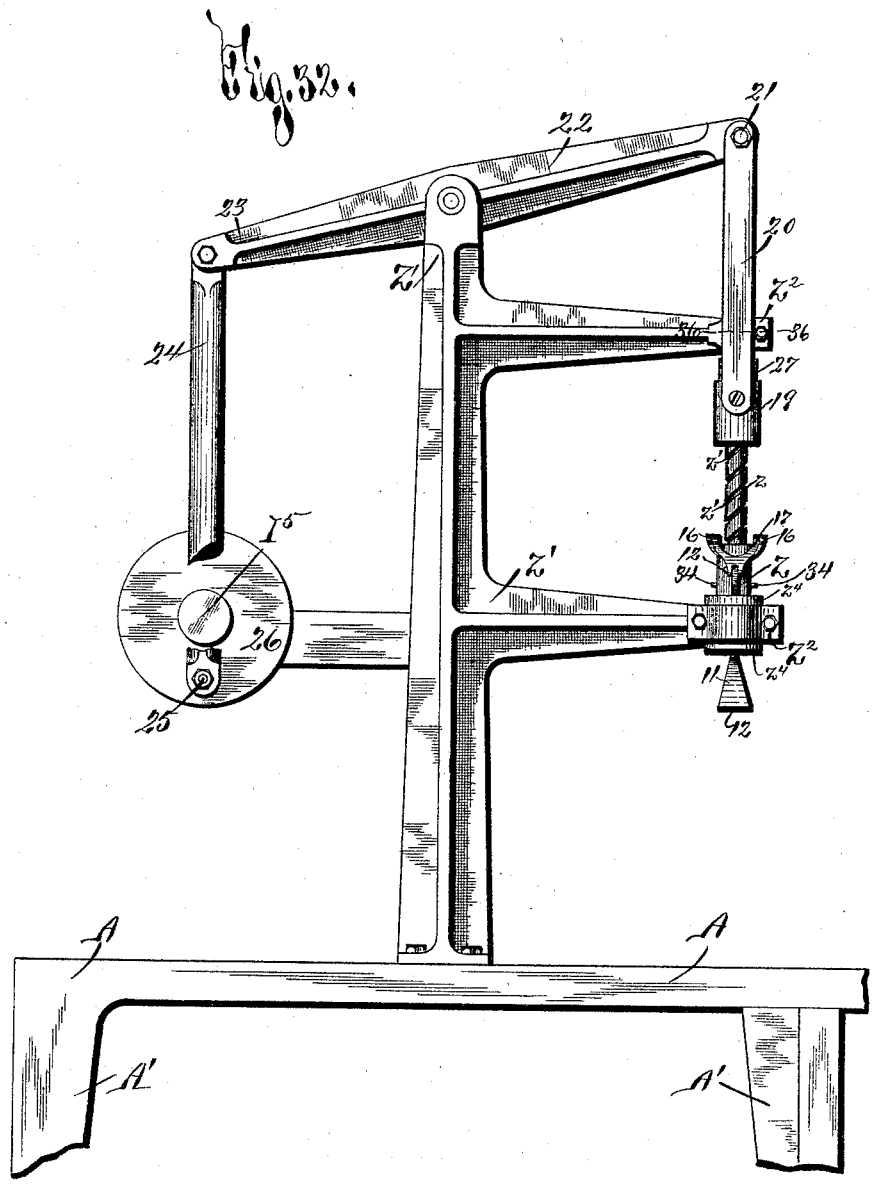

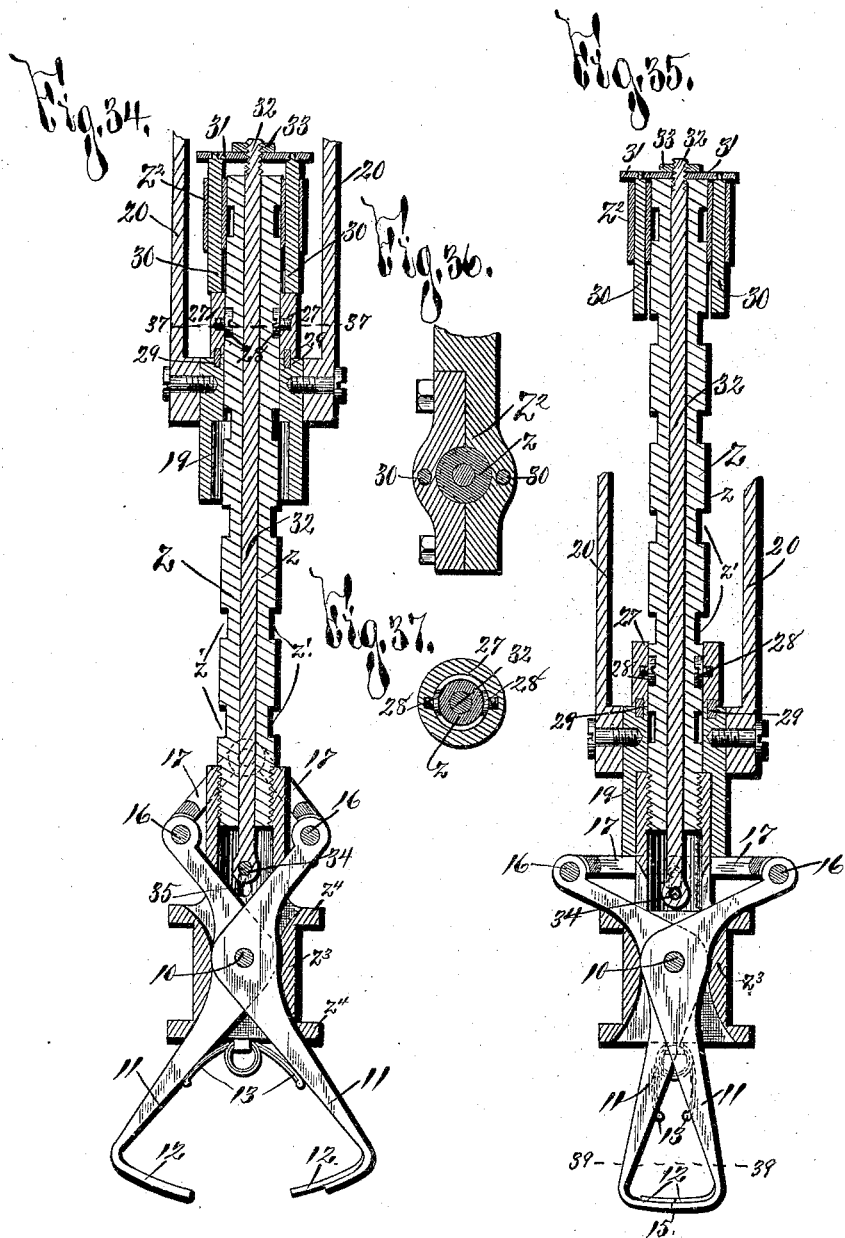

(No Model.) 23 Sheets—Sheet 21.
S. WILE & H. LACASSE.
MACHINE FOR CORKING BOTTLES AND WIRING THE CORKS THEREIN.
No. 443,185. Patented Dec. 23, 1890.
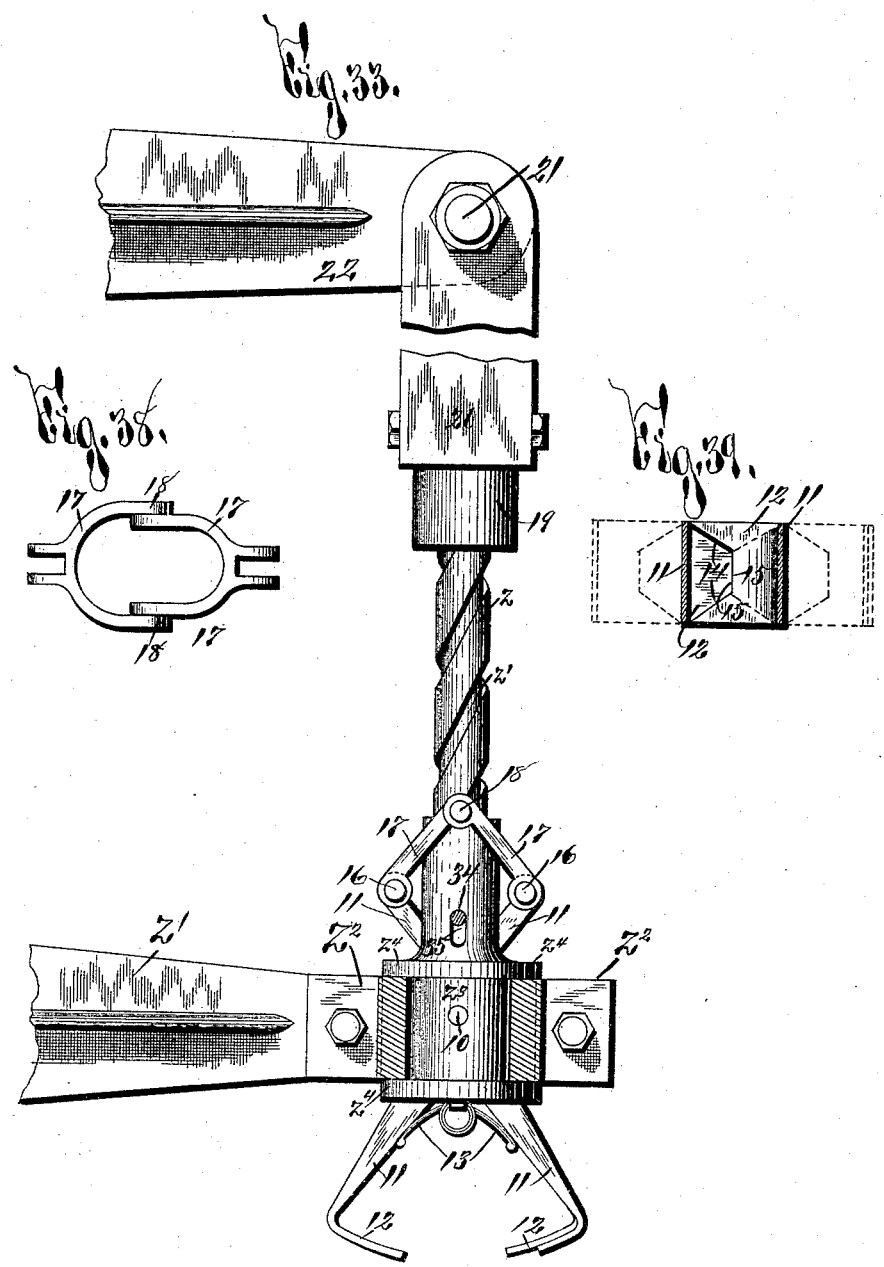
WITNESSES:
INVENTORS
Sol Wile & Henry LaCasse
BY
George W. Hey
ATTORNEY (No Model.) 23 Sheets—Sheet 22.
S. WILE & H. LACASSE.
MACHINE FOR CORKING BOTTLES AND WIRING THE CORKS THEREIN.
No. 443,185. Patented Dec. 23, 1890.
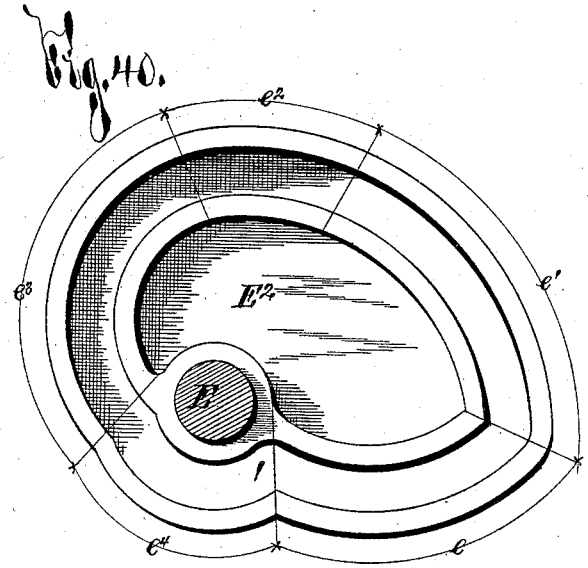
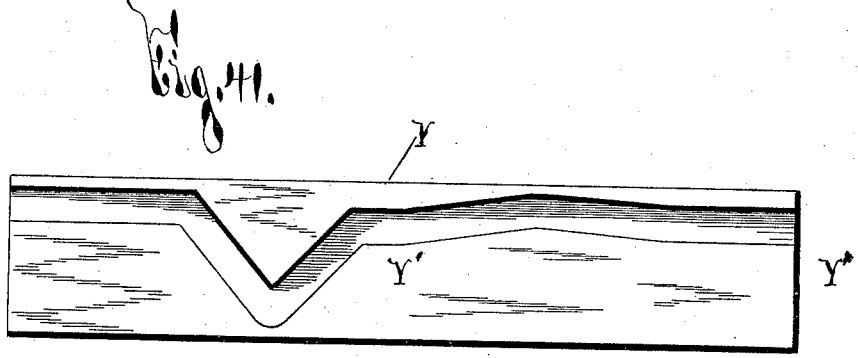
WITNESSES:
INVENTOR
BY
ATTORNEY (No Model.) 23 Sheets—Sheet 23.
S. WILE & H. LACASSE.
MACHINE FOR CORKING BOTTLES AND WIRING THE CORKS THEREIN.
No. 443,185. Patented Dec. 23, 1890.
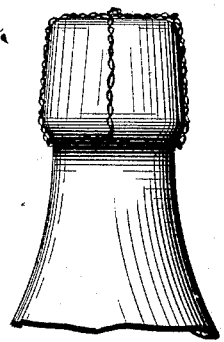
Fig. 44.
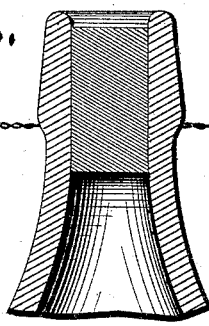
Fig. 43.
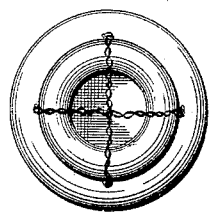
Fig. 45.
Fig. 42.
WITNESSES:
INVENTORS
Sol Wile & Henry Lacasse
BY
George W. Hey
ATTORNEY

UNITED STATES PATENT OFFICE.

SOL. WILE AND HENRY LACASSE, OF ROCHESTER, NEW YORK, ASSIGNORS TO THE BOTTLERS' SPECIALTY COMPANY, OF SAME PLACE.

MACHINE FOR CORKING BOTTLES AND WIRING THE CORKS THEREIN.

SPECIFICATION forming part of Letters Patent No. 443,185, dated December 23, 1890.

Application filed July 31, 1889. Serial No. 319,355. (No model.)

*To all whom it may concern:*

Be it known that we, SOL. WILE and HENRY LACASSE, of Rochester, in the county of Monroe, in the State of New York, have invented new and useful Improvements in Machines for Corking Bottles and Wiring the Corks Thereto, of which the following, taken in connection with the accompanying drawings, is a full, clear, and exact description.

Our invention relates to an improved machine for corking bottles and wiring the corks thereto of the particular class referred to in our application, Serial No. 291,772, filed November 24, 1888, and has for its object the production of a machine which shall automatically, accurately, and rapidly insert the cork into the bottle and securely wire said cork to the bottle in such a manner as to entirely obviate any liability of the cork's escapement from the bottle.

To this end it consists, essentially, in an automatic cork-feed for continuously feeding the corks one by one, a compressor in the discharge of the cork-feed, a feed or carrier for feeding the bottles to said compressor, a cork-inserter for inserting the cork, wire-securing mechanism operated to secure at opposite points on the bottle strands of wire projecting therefrom, a cut-off for severing from the wire-carrier the wire secured to the bottle when a suitable amount has been fed out, mechanism for turning the wire over the top or nose of the bottle across the inserted cork, and mechanism for securing the wire in said position, thus securing the cork to the bottle.

Our invention also consists in the detail construction and arrangement of parts, all as hereinafter more particularly described, and pointed out in the claims.

In describing our invention reference is had to the accompanying drawings, forming a part of this specification, in which like letters and figures indicate corresponding parts in all the views.

Figure 1 is a top plan view of our improved machine for corking the bottle and wiring the cork thereto, illustrating the relative construction and arrangement of the parts. Fig. 2 is an elevation of one side of our machine, illustrating particularly the arrangement of the wire-securing mechanism. Fig. 3 is a back view of the machine as illustrated in Fig. 1. Fig. 4 is a plan view similar to Fig. 1, with the cork-feed removed in order to better illustrate the construction and arrangement of the machine. Fig. 5 is an enlarged plan view with the cork-feed, compressor, and cork-inserter removed for the purpose of illustrating the underlying mechanism. Fig. 6 is a sectional view taken on line 6 6, Fig. 1, illustrating the compressor and the lower extremity of the cork-feed. Fig. 7 is an elevation of the detached wire-securing device and its actuating mechanism, the wire-securing mechanism being shown with its wire-securing jaws above the bottle and on the point of encircling the top thereof. Fig. 8 is a plan view, partly in section, of the devices illustrated in Fig. 7. Fig. 9 is an elevation, partly in section, illustrating the wire-securing mechanism as dropped below the plane of the top of the bottle for the purpose of securing the wire beneath the ridge of the bottle-head. Fig. 10 is an elevation showing the wire-securing mechanism retracted from the bottle after spinning out a sufficient length of wire projecting therefrom. Fig. 11 is an enlarged section of the shuttle and its wire-securing jaws. Fig. 12 is an enlarged view of the cork-feed with the cork-compressor open to receive a cork. Fig. 13 is a plan of the bottle-carrier and its actuating mechanism. Fig. 14 is a plan of the bottle-carrier support, the shaft of the bottle-support, and their respective actuating mechanisms. Fig. 15 is an elevation of the devices illustrated in Fig. 14, further illustrating their construction and arrangement. Fig. 16 is a detail view illustrating in elevation the mechanism for locking the bottle-carrier and for operating the bottle-support. Fig. 17 is a detail view illustrating in plan the mechanism for operating the bottle-support. Fig. 18 is a vertical section of the bottle carrier or feed, taken on line 18 18, Fig. 13, illustrating the detail construction and arrangement of said device. Fig. 19 is a horizontal sectional view of the bottle-carrier, taken on line 19 19, Fig. 18, illustrating particularly the oscillating arms for grasping and impinging the bottle. Fig. 20 is a top plan view of the detached upper part of the bottle-carrier. Fig. 21 is a plan view of a detached pair of the oscillating arms illustrated in Fig. 20. Fig. 22 is an elevation of the parts illustrated in Fig. 21. Fig. 23 is a top plan view of the cut-off and the device for holding the wire during the twisting thereof. Fig. 24 is a like plan view to Fig. 23, the cut-off and wire-holding device being shown in a different position to that illustrated in Fig. 23. Fig. 25 is an elevation of the parts illustrated in Fig. 23. Fig. 26 is a face view of the wire cutting and holding devices. Fig. 27 is a top plan view of the parts illustrated in Fig. 26. Fig. 28 is a sectional view taken on line 28 28, Fig. 27, illustrating the detail construction and arrangement of the parts shown in said figure. Fig. 29 is an elevation of the clutch mechanism for throwing into operation the gears for rotating the wire-securing mechanism to twist together the projecting extremities of the wire. Fig. 30 is a face view of the devices illustrated in Fig. 29. Fig. 31 is a sectional view taken on line 31 31, Fig. 29. Fig. 32 is an elevation of the detached mechanism for twisting together the projecting extremities of the wire after they have been turned upward above the top of the bottle. Fig. 33 is an enlarged elevation, partly in section, of the twisting device illustrated in Fig. 32. Fig. 34 is a longitudinal vertical section of the device illustrated in Fig. 33. Fig. 35 is a longitudinal section similar to Fig. 34, the wire-twisting device being shown in the position assumed when the twisting jaws or arms are impinged against the wire. Figs. 36 and 37 are sectional views taken, respectively, on lines 36 36, Fig. 32, and 37 37, Fig. 34, illustrating the detail construction of the wire-twisting device. Fig. 38 is a plan of the detached toggle connected to the twisting-arms for locking the same in their impinging position. Fig. 39 is a sectional view taken on line 39 39, Fig. 35, illustrating in full lines the impinging position of the wire-twisting arms or jaws, and in dotted lines their normal open position. Fig. 40 is an elevation of the cam for moving forward the wire-securing mechanism. Fig. 41 is an elevation of the cam for raising and lowering the device for elevating above the bottle the extremities of the wire projecting therefrom. Fig. 42 is a top plan view of the bottle with the wire projecting therefrom. Fig. 43 is a longitudinal section taken on line 43 43, Fig. 42. Fig. 44 is an elevation of the bottle with the projecting extremities of the wire turned upward and twisted together over the top of the cork, and Fig. 45 is a top plan view of the bottle shown in Fig. 44.

A represents the table, of suitable size, form, or material, mounted upon suitable supporting legs or standards A'. Preferably mounted upon or supported by the table or the standards thereof are the various elements of our invention, viz: a bottle-support L, a bottle feed or carrier R, a cork-feed J, a compressor H, a cork-inserter I, wire-securing mechanism or carrier D, a cut-off M, and a wire-twisting device $h$. The specific construction of said bottle feed or carrier R, wire-securing mechanism or carrier D, cut-off M, and wire-twisting device $h$ is set forth and specifically claimed in our respective pending applications, Serial Nos. 318,932, 330,259, 329,755, and 329,352.

B represents the motor-shaft supported in suitable brackets B', mounted upon the frame A. While power may be conveyed to this shaft in any desirable manner, a belt-pulley $B^2$ is preferably secured thereto, and by means of a connection to the prime-motor force motion is transmitted to the hereinbefore-mentioned parts.

Adjacent to the shaft B, and preferably beneath the same and supported by the brackets B', is a shaft C, preferably extending in a line parallel with the shaft B. Motion is transmitted from the shaft B to the shaft C by means of gears $B^3$ and C', mounted upon the respective shafts B and C.

By reference to the drawings it will be seen that the wire-securing mechanism or carrier D consists of two shuttles D' at an angle with each other and mounted on respective shafts $D^2$, also arranged at an angle with a greater distance between the rear than their forward extremities.

Secured on either side of the center of the shaft C are the bevel-gears $D^3$, meshing with like gears E', secured to the shaft E. By reference to Figs. 1, 2, and 4 of the drawings it will be seen that these shafts E extend preferably at right angles to the shafts $D^2$. The extremities of the shafts E adjacent to the shafts $D^2$ are provided with the cams $E^2$, having the camways $E^3$. The shafts $D^2$ are supported at their rearward extremities by the bearings $D^4$, pivoted at $d$ to the standards $d'$.

Pivoted at $f$ to the supporting-standards A' are the levers F, having their upper extremities bifurcated and provided with lugs $f'$, engaging adjacent surfaces of the collars $D^5$, secured to the shuttle-shafts $D^2$.

Formed or provided upon the lever F is the stud $f^2$ riding in the cam groove or way $E^3$ of the cam $E^2$. When a bottle is first fed beneath the cork-inserter I, the studs $f^2$ of the levers F stand at the points 1 of the cams $E^2$. As the cams are revolved in the direction indicated by the arrows in Fig. 7, the levers F are forced forward, moving forward the wire-securing shuttle D' until the shuttle-jaws $D^6$ are over the top of said bottle. These jaws $D^6$ are preferably formed of thin material, and are so arranged in relation to each other that the jaws of one shuttle lie snugly upon the jaws of the other shuttle.

Pivoted at $g$ to brackets G, adjacent to the inner faces of the cams $E^2$, are the levers G', pivoted at $g'$ to bearings $g^2$, mounted upon the respective shafts $D^2$. The levers G' are provided with depending arms $G^2$, the lower extremities of which are abutted by studs $E^4$, formed or provided upon the cams $E^2$.

Projecting from the brackets G are the pins $g^3$. The lower arms $G^2$ of the levers $G'$ rest against these pins $g^3$, and are thus prevented from downward movement and cause the levers G to support the shafts $D^2$, so that the shuttle-jaws $D^6$ are in a plane below the top of the bottle. When, as described, the shuttle-jaws are being moved forward over the bottle, and before their forward extremities reach the bottle, the studs $E^4$ contact with the lower extremities of the arms $G^2$ of the levers $G'$, forcing said arms upward, and also rocking upward the shafts $D^2$ and elevating the shuttle-jaws above the top of the bottle. The lower extremities of the arms $G^2$ of the levers $G'$ are preferably cam shape, and by the continued rotation of the shaft E the arms $G^2$ are forced backward by the weight of the shafts $D^2$, allowing said shafts to drop downward and causing the shuttle-jaws to encircle the top of the bottle. This downward movement of the shuttle-shafts $G^2$ takes place while the studs $f^2$ of the levers F are at the commencement of the part $e'$ of the camways $E^3$. From the peculiar construction of the arm $G^2$ of the lever G the downward movement of the shuttle-jaws is instantaneous, and the forward portion of the part $e'$ of said cam allows this instantaneous dropping of the shuttle-jaws before actuating the levers F to retract the shuttle-jaws. Immediately after the dropping of the shuttle-jaws the part $e'$ of the cam $E^2$ retracts the levers F very quickly, in order that the shuttle-jaws may be quickly withdrawn from around the bottle.

As will be hereinafter described, a carrier R holds the bottle and feeds the same over the bottle-support, which, as will be also hereinafter described, is lowered before the shuttle-jaws are moved over the top of the bottle. Immediately after the dropping of the shuttle-arms to embrace the top of the bottle the compressor H is brought down to the top of the bottle. The top of the bottle enters a recess $H'$ in the lower extremity of the compressor and causes the compressor to cap over the bottle, and thereby aid in supporting the same during the retraction of the shuttle-jaws. The compressor H consists of a fixed jaw $H^2$ and a movable jaw $H^3$, hinged at $h$ to the fixed jaw $H^2$. The compressor-supporting bracket $H^4$ is supported upon a standard $H^5$, mounted upon a table A.

Pivoted at $h'$ to the supporting-bracket $H^4$ is the bell-crank lever $H^6$. One arm of said lever is pivoted at $h^2$ to the movable jaw $H^3$ of the compressor and the other arm is pivoted at $h^3$ to a connecting-rod $H^7$, pivoted at $h^4$ to the oscillating depending lever $H^8$, which lever is mounted on the shaft B.

Provided at the pivotal point $h^4$ is the stud or roller $h^5$, which rides upon a cam $H^9$, mounted upon the shaft C. As this cam is revolved, the roller or stud $h^5$ is forced upward, rocking the bell-crank lever $H^6$ and approximating the movable jaw $H^3$ to the fixed jaw $H^2$. By reason of the rocking of the lever $H^6$ the pivotal point $h^2$ of the said lever and movable compressor-jaw will be forced downward, thus forcing downward the compressor in its guideway in the supporting-bracket $H^4$ and causing the lower extremity of the compressor to cap over the top of the bottle, as previously stated.

Provided near the lower extremity of the compressor, above the recess $H'$, is the bulb or enlargement 2, which allows the cork to swell at this particular point, and thus remove any creases which may be formed by the compression thereof. In order that they may be readily compressed, the corks when fed to the compressor are soaked with water or steam, which becomes mixed with a fine dust contained in the pores of the cork.

When the cork is driven into the bottle, the liquid contained in the pores, together with the fine dust absorbed thereby, would be ordinarily forced into the bottle, causing the contained liquid to be deteriorated. In order to prevent this, we provide in the compressor, and preferably leading from the bulb 2 thereof, the passages 3, which allow the liquid contained in the cork to be readily forced out when the cork is compressed. It will be noticed that the compressor compresses the cork from the bottom upward, and thus forces the absorbed liquid upward and out of the cork. A suitable spring $H^{10}$, connected to the lever $H^7$ and the bracket $H^5$, retracts the compressor when the cut-out $h^6$ of the cam $h^9$ contacts with the stud or roller $h^5$.

Mounted above the compressor H is the cork-inserter I, which preferably consists of a plunger-rod guided through the arms $h^7$ of the bracket $H^5$ and the hub $h^8$, mounted upon the compressor-supporting bracket $H^4$.

Pivoted at $h^9$ to an upwardly-projecting arm of the bracket $H^5$ is the walking-lever $I'$, having one extremity connected by a link $I^2$ to the upward extremity of the plunger-rod I. A link or connection $I^3$ is pivoted at $i$ to the opposite extremity of the walking-lever $I'$, and is hinged at $i'$ to the crank $I^4$, secured to the shaft $I^5$.

A gear $B^4$, loosely mounted on the motor-shaft B, meshes with a gear $I^6$, secured upon the shaft $I^5$, and transmits motion thereto. When the gear $I^6$ is rotated, the crank $I^4$, by means of the connection $I^3$, elevates the point $i$ of the walking-lever, and thus forces the plunger I downward through the compressor and causes the same to insert the cork into the bottle. The gear $B^4$ is loose upon the shaft B and is locked thereto at the proper time by the clutch $b$ sliding on a spline or key way, locking the same to the shaft.

Pivoted to a bracket 4, mounted upon the main frame, is the lever 5. The upper extremity of said lever engages a grooveway 6 of the clutch $b$, and the lower extremity engages a grooveway 7 of a cam 8, mounted upon the shaft C. This cam 8 is so timed that when the compressor has compressed the cork the lever 5 locks the clutch $b$ to the gear $B^4$ and causes the rotation of the shaft $I^5$. When the crank-arm $I^4$ has operated the plunger I to insert the cork and has withdrawn the same to its normal upward position, the cam 8 is so timed as to automatically disengage the clutch $b$ from the gear $B^4$ until the compressor has been again operated by its actuating-cam $H^9$.

The corks, either dry or moistened by water or steam, are emptied promiscuously into a cork-feed J, mounted upon a suitable bracket J', supported by the standard $H^5$. The cork-feed is preferably conical in shape, and arranged centrally therein is the shaft $J^2$, having its lower extremity provided with a feeder $J^3$. This feeder may be of any desirable form or construction, but is here shown as the downwardly-extending extremity of the shaft bent or turned into a spiral form. Opening into the cork-feed J is the feed-passage $J^4$, of suitable size to allow the corks to readily feed therethrough. The lower extremity of the feeder or conveyer $J^3$ is bent in a cylindrical form and preferably fits on the interior of the upper part of the feed-passage $J^4$. The conveyer is revolved in the direction indicated by the arrow, causing the corks to be agitated upward and forcing them toward the center thereof and into a vertical position, whereupon they readily feed through said passage or tube $J^4$.

At the upper end of the shaft $J^2$ is the wheel $J^5$, around which runs a belt $J^6$, guided over suitable idlers $j\,j\,j$. Secured upon the shaft B is the wheel $J^7$, around which is passed the belt $J^6$ after leaving the idlers $j$. It will thus be seen that by the rotation of said shaft B the feeder $J^3$ is constantly rotated. The lower extremity of the feed-tube $J^4$ is preferably mounted just above the compressor and feeds the corks directly thereinto.

In order to feed but one cork at a time and feed the same at a time when the compressor is open, we provide the cut-off K, which consists of a frame or hub K', having arms $K^2$, operated through a cut-out or cut-outs provided in the lower extremity of said feed-passage. The hub or frame K' is pivoted upon the pin $k$, supported in a bracket $k'$, mounted upon the compressor-supporting bracket $H^4$. Projecting downwardly from said frame K' is the arm $K^3$, preferably formed integral therewith. Guided in the free extremity of the arm $K^3$ is the bar $K^4$, one extremity of which bears against either the movable compressor-jaw or the lever $H^6$ for operating the said jaw. The cut-off arms $K^2$ are so arranged or formed that when the depending arm $K^3$ drops downward by force of gravity, when the movable jaw of the compressor is approximated to the fixed jaw, the lower arm $K^2$ will be forced into said feeding-tube, forming a stop for the corks, and the upper arm will be forced out of said feeding-tube, allowing the corks to readily feed upon the lower arm. When by the lever $H^6$ the compressor is opened, the said lever or movable compressor-jaw abuts against the bar $K^4$ and forces upward the arm $K^3$. Upon this movement the upper cut-off arm is forced into the feeding-tube, shutting off the feed of the corks above said arm, and the lower cut-off arm is withdrawn from the feeding-tube, allowing the cork below the upper cut-off arm to readily fall into the compressor. It will thus be seen that with each operation of the compressor a cork is fed thereinto. Immediately after the compressor has capped the top of the bottle, and before the operation of the plunger to insert the cork, the bottle-support L is moved upward, contacting with the bottom of the bottle to form a support therefor during the operation of the cork-inserter. The support L is formed with a depending screw-shank L', guided in the bracket $L^2$, secured to a standard A' of the table A. Engaging said shank L' and mounted above the top face or shoulder of the bracket $L^2$ is the gear $L^3$. Engaging said gear $L^3$ is the pivoted segment $L^4$, having an arm $L^5$. Pivoted to said arm $L^5$ is the link $L^6$, hinged at $l$ to a sliding rod $L^7$. At the outer end of this rod is secured a lug $L^8$, against which bears the stud $l^2$, secured to the gear C', mounted on the shaft C. This rod $L^6$ is guided and supported in a depending bracket $L^9$, secured to the table A. Interposed between the lug $L^8$ and the adjacent face of the bracket $L^9$ is the spring $L^{10}$, which retracts said lug after the passage of the stud $l^2$, and swings backward the segment $L^4$.

As previously mentioned, just before the operation of the compressor the support is lowered by the contact of the stud $l^2$ with the lug $L^8$, which forces the segment in the direction indicated by the arrow at Fig. 17. Just before the operation of the plunger the stud $l^2$ passes from engagement with the lug $L^8$, and immediately the spring $L^{10}$ retracts the segment $L^4$ in an opposite direction to that indicated by the arrow, and thus elevates the bottle-support. Immediately after the top of the bottle has been capped by the compressor the shuttle-jaws are retracted. By reference to Fig. 11 it will be seen that these shuttle-jaws $D^6$ are pivoted at $d^2$ to the shuttle or wire-carrier frame $D^7$. Provided upon the shuttle-jaws are the shoulders $d^3$, between which and the shuttle-frame are interposed the springs $d^4$, which springs approximate together the forward extremities of said shuttle-jaws. The shoulders $d^5$, provided at the rear of said shuttle-jaws, prevent the forward extremities thereof being approximated too closely.

Revolubly mounted in the frame $D^7$ is the spool $D^8$, around which two strands of wire are wound side by side, thus forming two feeding ends upon the same spool. The spool $D^8$ is retained by the pin $d^6$, provided at one extremity with the head $d^7$ and at the other with the spring-dog $d^8$, having a shoulder abutting upon the outside of the shuttle-frame $D^7$. When desired to remove the spool, the spring-dog $d^8$ is forced inward into a slot in the pin $d^6$, and the pin can be then readily withdrawn.

It will be understood that when the spool is full the revolution thereof will generate centrifugal force, which will cause the wire to be fed therefrom with greater rapidity than when the wire on the spool is partly used. However, in order to equalize the feeding of the wire, we provide the spring $d^9$, bearing thereagainst and preferably secured to the frame $D^7$ of the shuttle. The tension of this spring is varied as desired by means of a small screw $d^{10}$, screwing into the frame $D^7$ and bearing against said spring.

When, as previously described, the wire-carrier or shuttle is retracted, the shuttle-jaws ride around the top of the bottle against the action of the springs $d^4$. This rearward motion of the shuttle-jaws is performed by the last portion of the part $e'$ of the camway $E^3$, which is of such a form as to quickly retract the shuttle-jaws after they have been dropped, so as to catch the wire beneath the ridge of the bottle-head, as previously described. Immediately after the retraction of the shuttle-jaws clear of the bottle the shaft $D^2$ is rotated, and after this retraction of said jaws the portion $e^2$ of the cams $E^2$ coincides with the studs $f^2$ of the levers F. These portions $e^2$ are almost concentric with the center of the cams, and consequently the shuttle-jaws are withdrawn but very little, thus causing the wire-twisting mechanism to form a tight twist next to the bottle.

The shuttle-shafts $D^2$ are rotated by means of bevel-gears $D^9$, secured thereto by feathers riding in keyways in said shafts. These gears $D^9$ mesh with gears $B^5$, loosely mounted on the shaft B. The gears $B^5$ are formed with clutch-faces, which are adapted to be engaged by sliding clutch-sections $B^6$, mounted upon the shafts B of said gears $B^5$. These sliding clutch-sections are thrown in engagement by means of levers $B^7$, pivoted to the brackets B'. The lower ends of said levers $B^7$ ride in camways of the cams $B^8$, secured to the shaft C. These camways are so timed that immediately the rotation of the shaft C has operated the levers F to withdraw the shuttle-jaws clear of the bottle the levers $B^7$ are oscillated to engage the clutches $B^6$ with the gears $B^5$, and thus bring about the rotation of the shuttle-jaws and the twisting of the wire projecting from the bottle.

As shown in Fig. 29, connected to the lower extremities of the levers $B^7$ are links $B^9$, pivoted to levers $B^{10}$, mounted upon an arm of the bracket B'. Pivoted to said levers $B^{10}$ are levers $B^{11}$ for locking the gears $B^5$, and preventing the rotation thereof after the completion of the twisting. Formed upon these levers $B^{11}$ are teeth or projections $b'$, which are engaged with notches $b^2$ of the gears $B^4$. The lower extremities $b^3$ of the levers $B^{11}$ are interposed between lugs $b^4$ $b^5$, formed upon the levers $B^{10}$, as shown in Fig. 29. The projections $b^4$ abut against the extremities $b^3$ of the levers $B^{11}$, and when the levers $B^7$ are oscillated, engaging the clutches $B^6$ with the clutch-faces of the gears $B^5$, it will be seen that the projections $b^4$ will oscillate the levers $B^{11}$ and unlock the gears $B^5$, permitting the same to be rotated. When the wire has been twisted for a sufficient distance, the levers $B^7$ are operated to force the clutches $B^6$ out of engagement with the gears $B^5$.

Interposed between the projections $b^5$ of the levers $B^{10}$ and the adjacent faces of the extremities $b^3$ of the levers $B^{11}$ are springs $b^6$, which when the clutches $B^6$ are disengaged from the gears $B^5$ force the teeth $b'$ of the levers $B^{11}$ against the adjacent faces of the gears $B^5$. The notches $b^2$ upon the gears $B^5$ are so arranged that when the stop-teeth $b'$ are engaged therewith the shuttle-jaws will stand in a horizontal position. However, should the teeth $b'$ of the levers $B^{11}$ be forced against the gear before the notches $b^2$ have been rotated sufficiently far to engage said teeth, it will be seen that the springs $b^6$ will allow the teeth $b'$ to press against the faces of the gears with a spring-pressure, and immediately upon the registration of the notches $b^2$ with said teeth the springs $b^6$ will force the same thereinto.

As described, immediately after the portion $e'$ of the cams $E^2$ have retracted the shuttle-jaws clear of the bottle the portions $e^2$ of said cams withdraw said jaws slowly, and the mechanism for rotating the shafts $D^2$ is brought into action, revolving the shuttle-jaws next to the bottle and forming a desired number of tight twists. After the forming of these tight twists the portions $e^3$ of the cams $E^2$ engage the studs $f^2$. These portions $e^3$ are of such contour as to withdraw the shuttle-jaws quickly to a point the desired distance from the bottle. During this withdrawal of the shuttle-jaws it will be understood that the shafts $D^2$ are being rotated, thus twisting the wire together. It will thus be understood that the wire between the tight twists immediately next to the bottle and the shuttle-jaws is loosely twisted by reason of the quick retraction of said jaws. When the studs $f^2$ have reached the end of the portions $e^3$ of the cams $E^2$, the cut-offs M and the wire-holders P are brought into operation. The cut-offs M and the holders P are formed or provided upon levers M' and $M^2$, which are mounted upon pivotal pins $M^3$, supported by the brackets $M^4$, mounted upon the table A. Secured to the lower part of the pivotal pins $M^3$ are the levers N, hinged at $n$ to links $N^2$, hinged at $n^3$ to the sliding rod or connection N'. Formed upon the rod N is the stud $n'$, riding in the camway O' of the cam O, secured upon the shaft C. This cam O is so timed that after the shuttles have spun the tight twists next to the bottle it forces forward the rod N' and swings the cut-off and holders on their pivotal pin toward the wire, which is immediately engaged thereby. The levers $M^2$ are loose upon the pivotal pins $M^3$, and provided upon said levers are standards $m$ and $p$, having jaws $m'$ and $p'$, which engage the wire when the cam O forces forward the rod $N'$.

Pivoted to the jaws $m'$ and $p'$ at $m^2$ and $p^2$ are like cut-off and holder jaws $m^3$ and $p^3$. Depending from the frame connecting said jaws $m^3$ and $p^3$ is the projecting arm $m^4$, to the lower extremity of which the free extremity of the lever $M'$ is hinged. Secured to this frame connecting the jaws $m^3$ and $p^3$ is the spring $M^5$, the extremity of which is extended downward and bears against the rearward face of the jaw $m^2$ at the point $m^5$.

By reference to the drawings, especially Fig. 26, it will be seen that the cut-off jaws $m'$ and $m^3$ are offset or lie one against the other, so that the jaw $m^3$ may shear past the cutting-edge of the jaw $m'$. It will also be seen that the jaws $p'$ and $p^3$ are directly aligned with each other, so that the wire will not be cut off, but will be merely held or pinched by said jaws. The levers $M'$ are rigidly secured to the pivotal pins $M^3$, and when the levers N force the said cut-off and wire-holder jaws against the wire the pressure of the spring $M^5$ will move the loose levers $M^2$ toward said wire. Immediately after the jaws secured upon the separate standards $m$ and $p$ have been forced against the wire their movement will be checked, since the supporting-levers $M^2$, upon which said standards are mounted, are loosely journaled on the pivotal pin $M^3$. The levers $M'$, however, are rigidly secured to the pins $M^3$, and the cam is of such a form as to force the rod $N'$ forward after the stoppage of the levers $M^2$ by contact with the wire. It will thus be seen that the levers $M'$ must be slightly forced forward, and this movement is allowed by reason of the spring $M^5$, which is thus compressed. The jaws $m^3$ are thus swung on the pivots $m^2$, and operate to shear by the jaw $m'$ cutting off the wire, and the jaws $p^3$ are forced tightly against the wire. Just before the cutting off of the wire the studs $f^2$ of the cams $E^2$ are engaged by the portion $e^4$ of the cams $E^2$. This portion $e^4$ is of such a form as not to retract the shuttle-jaws, and consequently as the twisting of the wire is still continued a certain number of tight twists will be made next to the jaws $p'$ and $p^3$. Immediately after these tight twists have been made the clutch $B^6$ is disengaged from the gear $B^5$ and the rotation of the shuttle-jaws is stopped. It will thus be seen that after the wire secured to the bottle is cut off from the wire fed from the shuttle-jaws a portion of the wire will be left twisted together, projecting from said shuttle-jaws, and that the part of the wire immediately adjacent to the shuttle-jaws is tightly twisted together, preventing any untwisting of the twisted wire, when the shuttle-jaws are again operated to encircle the bottle and apply the wire thereto. After the operation of the cut-off, as described, the cam O retracts the rod $N'$, swinging the cut-offs and wire-holders out of the line of motion of the shuttle-jaws in their next operation of advancing forward to encircle the neck of the bottle.

In order to feed the bottles continuously to the bottle-support, we provide the bottle-carrier R, mounted upon the rod $R'$. This rod is stationary, and is secured by set-screws $r$ to the supporting-bracket $L^2$ of our machine. Below the lower bracket $L^2$ is a bracket $R^2$, through the hub $R^3$ of which is guided the rod $R^4$. Interposed between the top face or shoulder $R^5$ of the hub $R^3$ and a support $R^6$ at the upper extremity of said rod is the coil-spring $R^7$, which constantly forces upward said support $R^6$.

The bottle-carrier R is provided with the oscillating arms S, arranged in pairs and pivoted between disks $S'$ by pins $s$. These pins $s$ work in a slot $s'$ in said disks concentric with the rod $R'$, and are secured in the desired position by means of nuts $s^2$, bearing against the said plates.

Pivoted at $s^3$ to the inner extremities of the arms S are the toggle-levers $S^2$, hinged to each other at $s^4$. Provided at the hinged joint $s^4$ of the toggle-levers $S^2$ are the rollers $s^5$, which bear against the periphery of a cam $S^3$, rigidly secured to the rod $R'$. Pivoted at $s^6$, at the forward extremity of the carrier-arms S, are the hinged impinging faces $S^4$, preferably faced with rubber $S^5$. The cut-out $S^6$ of the cam $S^3$ is preferably arranged adjacent to the yielding support $R^6$ for the bottles, so that when the carrier-arms are aligned with said support they are normally opened to allow of the entrance of the bottle. In order to open said arms, we prefer to use the cam T, arranged above the carrier-arms. The upper extremities of the hinge-pins $s$ project upwardly beyond the arms S into a cam-groove $T'$ of the cam T. This cam-groove is of like contour to the cam $S^3$, and constantly forces the rollers $s^5$ tightly against the cam $S^3$. The lower extremities of said hinge-pins $s^4$ project below the carrier-arms S into slots $s^7$ in the lower disk $S'$. In order to reduce the friction on said projecting point, we provide the rollers $s^8$, which ride in said slots $s^7$ and guide the inner extremities of the carrier-arms when the carrier-arms are being operated. After the bottle has been placed between the open carrier-arms the said arms are closed by the cam $S^3$, forcing outward the toggle-levers $S^2$ and straightening the same into a locked position, thus tightly impinging the bottle and also securely holding the bottle in said position until the cam-groove $T'$ of the cam T unlocks the toggle-levers by forcing backward their hinge-pin and causes the carrier-arms to release the bottle.

The lower disk $S'$ is provided with the depending hub $S^7$, which is supported by a set-screw $s^9$ in the hollow hub U, mounted above the top face of the bracket $L^2$. Formed upon the hub U is the disk or plate U', having provided in its top face ratchet-notches $u$. Pivoted around the hub U is the lever $U^2$, having its free outer end pivoted at $u'$ to a sliding rod $U^3$. Hinged to ears $u^2$ formed upon said lever $U^2$ is the ratchet $U^4$, which engages the ratchet-notches $u$ of the disk or plate U'. Hinged at $u^3$ to the rod $U^3$ is the sliding rod $U^5$, having secured at its outer extremity the lug $U^6$. A stud or roller $l^3$, secured to the gear C', contacts with the lug $U^6$, forces forward the rod $U^5$ against the action of a retracting-spring $U^7$, and swings the lever $U^2$ partly around on the hub U, causing the ratchet $U^4$ to engage the disk or plate U'. Just before this movement of the plate a lock V, which engages notches $v$ in the edge of said plate, is withdrawn therefrom to allow the plate to be revolved. The lock V is guided in a supporting-bracket V' and is formed upon the extremity of a sliding rod $V^2$. Hinged at the rearward extremity of said rod $V^2$ at $v'$ is a depending arm $V^3$, hinged at $v^2$ to a bracket $V^4$, mounted upon the table A. Formed integral with or rigidly secured to said arm $V^3$ is the arm $V^5$, which is contacted by a stud $v^3$, formed upon the cam O. A spring $V^6$, interposed between a guide-bracket $L^9$ for the sliding rod $V^2$, and a collar $V^7$, provided thereupon, normally engage the lock V with the notches $v$ of the disk U'. When the arm $V^5$ is engaged by the stud $v^3$, the said arm is rocked backward, withdrawing the lock against the action of the spring $V^6$. Upon the rotation of the disk U' it will be seen that the carrier-arms will remove the bottle from the yielding spring-support $R^6$ and that a new bottle will be fed by the carrier directly over the bottle-support L. As previously described, this bottle-support is lowered just before a new bottle is fed thereupon, and after the compressor has capped the top of the bottle the support is then raised to support said bottle.

It will be understood that the bottle-support is loose upon its actuating-shaft, and that the same does not turn with the rotation of said shaft, but is merely raised and lowered thereby. In order to prevent the turning of the loose bottle-support, we provide therein a guide-slot $l^4$, which engages a guide-piece $l^5$, secured upon the frame A.

Mounted above the bottle-carrier arms are the levers W, which form a gage for the bottles, elevate the projecting extremities of the wire, and after the same are twisted together over the top of the cork trim or cut off the untwisted extremities and then press them firmly upon the cork, and then finally discharge the bottle from the carrier. These levers W are pivoted at $w'$ to a support $w$. Pivoted at $w^2$ to the inner extremities of the levers W are the toggle-levers W', pivoted to each other at $w^3$. A cam $W^2$ bears against the pivotal pins of the toggles to straighten the toggles and force together said levers W, as presently described.

When the bottle is inserted between the open carrier-arms, the levers W are forced together. The top of the bottle is contacted with said levers, which here serve as a gage to keep the tops of the bottles in the carrier in the same plane. Extending upwardly from the pivotal point of the toggle-levers W' are the projections $W^3$, guided in slots $W^5$, provided in a disk $W^6$, mounted above the cam $W^2$. On the under side of said disk $W^6$ are the levers $W^7$, pivoted thereto at $w^4$. One extremity of said levers bears against the upward projection $W^3$, and the other extremity is contacted by a pin $w^5$, secured at the top of the cam $W^2$. The supporting-standards $w$ of the pivoted arms W are extended downward through guide-passages provided in the disk X, loosely revolving around the rod R'. This disk is provided with an upturned flange having openings in the periphery thereof to allow of the up-and-down movement of the levers W. Rigidly secured to the rod R' is a cam Y, having a groove Y'. Provided upon the depending support $w$ is a roller or stud $W^{71}$, engaged with the camway Y' of the cam Y, which camway is of the shape illustrated in Fig. 41. After the bottle has been grasped by the carrier-arms and the levers W have been separated, as shown in Fig. 21, the supporting-pin $w$ of said levers is depressed by the camway Y' and the said levers encircle the top of the bottle. Immediately after this operation of the levers the bottle-carrier is again partly moved around the rod R', and the bottle having its neck encircled with the levers W is placed over the bottle-support L. The shuttle-jaws are then forced over said bottle and are dropped to secure the wire to the ridge of the head thereof, and a cork is then inserted into the bottle. The shuttle-jaws then secure the wire to the bottle and the cut-off is operated to cut off the wire secured to the bottle from the shuttle. It will thus be seen that the wire is secured to the bottle with its extremities projecting therefrom, and that the levers W encircle the bottle beneath said projecting extremities of the bottle.

Immediately after the operation of the cut-off the levers W are elevated by the camway Y', and as they are elevated above the top of the bottle they force upward the projecting extremities of the wire. As soon as they are clear of the bottle and during their elevation, these levers are approximated together by the cam $W^2$, so that the projecting extremities of the wire are gathered together over the top of the bottle. This elevation of the projecting extremities of the wire preferably takes place while the bottle-carrier is being again partly revolved, in order to align the said bottle with the wire-twisting mechanism, which, as presently described, is operated to twist together over the top of the bottle and cork the projecting extremities of the wire.

Immediately after the operation of the wire-twisting mechanism the levers W are by the camway Y' raised above the projecting twisted-together extremities of the wire. Immediately the cam W² forces these levers together. By reference to the drawings it will be seen that the outward extremity of one of said levers lies upon the other, and as the cam W² forces these extremities together they shear or trim off the untwisted extremities of the wire, thus adding to the appearance thereof. The cam Y' then operates to force the levers W downward, and thus flatten the twisted extremities of the wire down upon the top of the cork. Immediately upon this operation of the levers W the bottle-carrier arms are by the camway T' disengaged from their impingement of the bottle. The camway Y' then causes the levers W to depend still farther and by contact with the top of the bottle force the same from between the bottle-carrier arms S, thus discharging the bottle.

Immediately after a new bottle has been grasped by the carrier the pin $w^5$, secured to the cam W², contacts with the free extremity of the adjacent lever W⁷, rocks the said extremity outward and the opposite extremity inward, thus unlocking the toggle-levers W' and separating the levers W. It will thus be seen that the levers W are respectively gages, wire-lifters, wire clippers or trimmers, and discharge for the bottles.

The wire-twisting mechanism Z is supported by a bracket Z', mounted upon the main frame A of our machine. Journaled in hubs Z² of said bracket Z' is the spindle $z$, provided with screw-threads $z'$. At the lower extremity of said spindle is the hub $z^3$, having flanges $z^4$ bearing against shoulders provided on the top and bottom face of the lower hub Z² and preventing said screw-spindle from upward or downward movement.

Hinged at 10 to the hub $z^3$ are the twisting-levers 11, having their downward extremities provided with inwardly-turned feet or projections 12. These lower extremities of the twisting-arms 11 are normally forced apart by the spring 13. The adjacent edges of the levers 11 are provided with the cut-outs 14. When the lower extremities of the levers 11 are approximated against the projecting extremities of the wire, the foot of one lever lies snugly upon the foot of the other lever, allowing the adjacent edges 15 of the cut-outs 14 to impinge the interposed wire. Pivoted at 16 to the upper extremities of the lever 11 are the toggle-levers 17, pivoted to each other at 18.

Guided vertically up and down the spindle $z$ is the sleeve 19, which is secured to straps 20. These straps 20 are pivoted at 21 to a walking-lever 22, pivoted to the bracket Z'. The opposite extremity 23 of the lever 22 is pivoted to a depending connecting-rod 24. This connecting-rod is pivoted at 25 off the center of a disk or plate 26, mounted upon the shaft I⁵. This shaft revolved, as described, by the gearing I⁶ and B⁴, causes the sleeve 19 to contact with the toggles 17 and straighten them in the position illustrated in Fig. 35.

Mounted on the top face of the sleeve 19 is a second sleeve 27, having rollers 28, engaging the threads $z'$ of the spindle $z$. Secured to the sleeve 27 are the projecting extremities or teeth 29, engaging notches in the top face of the sleeve 19. When the sleeve 19 is forced downward, the sleeve 27 will fall downward by gravity and the projections 29 will engage the notches in the top of the sleeve 19. Upon the upward movement of the sleeve 19 the projecting extremities 29 of the sleeve 27 will securely prevent the latter sleeve from rotation. By reason of the engagement of the studs or rollers 28 with the threads $z'$ the spindle $z$ will be rotated. As the twisting arms 11 are supported in the hub of said spindle, the said arms will also be rotated, causing the same to twist together the projecting extremities of the wire. Supported in the top head Z² and depending downwardly therefrom are the pins 30, secured at their top extremities to a plate 31.

Running vertically through the spindle $z$ is the rod 32, having secured at the upper extremity thereof a nut or shoulder 33, bearing upon the plate 31. At the lower extremity of the rod 32 is secured a cross-rod 34, guided in a slot 35 in the hub $z^3$. The extremities of said rod project outwardly from the hub $z^3$, and are preferably just below the plane of the toggle-arms when in their locked position. When the sleeve 19 is retracted, the top face of the sleeve 27 contacts with the lower extremities of said rods 30, and by means of the plate 31 and the shoulder or nut 33 the rod 37 is forced upward. It will then be seen that the rod 34 forces the toggle-levers out of their locked position and allows the spring 13 to separate the lower extremities of said levers.

All the parts of our machine work conjointly by timed mechanism, and it will be observed that while the cork-inserter is inserting the cork the wire-securing mechanism is at substantially the same time—that is, jointly therewith—securing the wire to said bottle.

In our machine previously referred to we used but one shuttle; but experience has demonstrated the fact that a wire secured in this manner is not as efficient in preventing the premature discharge of the cork. We have found that sometimes the pressure formed within the bottles is so great that the cork is frequently caused to turn out of the bottle between the wire and the edge of the mouth. By using two or more shuttles and securing strands of wire to the bottle, so that the same project at an angle therefrom, and by then uniting the several strands together over the top of the bottle and cork, this escape of the cork is entirely obviated.

The operation of our invention will be readily perceived from the foregoing description and upon reference to the drawings, and it will be seen that after a bottle is engaged by the carrier the bottle is fed to its support, the shuttle-jaws are then caused to encircle the top of the bottle, and immediately the compressor having compressed the cork to the desired size caps over the bottle and the cork is then inserted. During this time the shuttle-jaws are operated to secure the wire to the bottle, and after the retraction of the said jaws the cut-off severs from the shuttle-jaws the wire secured to said bottle. The wire-lifters then elevate the projecting extremities of the wire, which are then grasped by the wire-twisting device. Upon the operation of this last-named mechanism the operation of corking the bottle and wiring the cork thereto is finished, and the wire is then clipped or trimmed, and the bottle is then discharged from the bottle-carrier arms by the discharge.

It will be particularly noted that considerable change may be made in the detail construction and arrangement of our improved invention without departing from the spirit thereof.

Having thus fully described our invention, what we claim as new, and desire to secure by Letters Patent, is—

1. The herein-described bottle-wiring machine having the following mechanisms, to wit: for securing strands of wire to the bottle with their extremities projecting, for securing a second number of strands of wire to the bottle with their extremities projecting at different points from the first-secured strands of wire, for twisting together the extremities of the first-secured strands, for twisting together the extremities of the second-secured strands, for turning the said twisted extremities of the wire over the top of the bottle and the inserted cork, and for securing the wire in said position, and connected mechanism for operating the foregoing in due order, substantially as described.

2. The herein-described bottle-wiring machine having the following mechanisms, to wit: for securing strands of wire to the bottle with their extremities projecting, for securing a second number of strands of wire to the bottle with their extremities projecting at different points from the first-secured strands of wire, for twisting together the extremities of the first-secured strands, for twisting together the extremities of the second-secured strands, for turning the twisted extremities of the wire over the top of the bottle and the inserted cork, and for twisting together said twisted extremities of the wire, and connected mechanism for operating the foregoing in due order, substantially as set forth.

3. The combination of the following mechanisms, to wit: for securing strands of wire to the bottle with their extremities projecting therefrom, for securing a second number of strands of wire to the bottle with their extremities projecting therefrom at an angle with the extremities of the first-secured strands, for inserting a cork into the bottle, for turning the wire over the top of the bottle and the inserted cork, and for securing the wire in said position, and connected mechanism for operating the foregoing parts conjointly in due order, substantially as and for the purpose set forth.

4. The combination of a bottle-support and a cork-inserter with the following wire-securing mechanisms, to wit: for securing strands of wire to the bottle with their extremities projecting therefrom, for securing a second number of strands of wire to the bottle with their extremities projecting therefrom at an angle with the extremities of the first-secured strands, for turning upward the projecting extremities of the wire, and for securing the wire in said position, and connected mechanism for conjointly actuating the wire-securing mechanism and the cork-inserter, substantially as set forth.

5. The combination of a bottle-support and cork-inserter with the following wire-securing mechanisms, to wit: for securing strands of wire to the bottle with their extremities projecting therefrom, for securing a second number of strands of wire to the bottle with their extremities projecting therefrom at an angle with the extremities of the first-secured strands, for turning upward the projecting extremities of the wire, and for twisting together said upturned projecting extremities of the wire, and connected mechanism for conjointly actuating the wire-securing mechanism and the cork-inserter, substantially as described.

6. The combination of a bottle-support and a cork-inserter with the following wire-securing mechanisms, to wit: for securing strands of wire to the bottle with their extremities projecting therefrom, for securing a second number of strands of wire to the bottle with their extremities projecting therefrom at an angle with the extremities of the first-secured strands, for twisting together the projecting extremities of the first-secured strands of wire, for twisting together the projecting extremities of the second-secured strands of wire, for turning upward over the top of the bottle and the inserted cork the twisted extremities of the wire, and for securing the wire in said position, and connected mechanism for conjointly actuating the wire-securing mechanism and the cork-inserter, substantially as and for the purpose set forth.

7. The combination of a bottle-support, a cork-inserter having a movement toward and away from said support, wire-securing mechanism having a movement toward and away from said support for securing strands of wire to the bottle with their extremities projecting therefrom, a second wire-securing mechanism, also having a movement toward and away from said support for securing to the bottle a second number of strands of wire projecting therefrom at an angle with the first-secured strands, mechanism for securing the wire over the top of the bottle and the inserted cork, and mechanism for conjointly operating the cork-inserter and the wire-securing mechanism, substantially as specified.

8. The combination of a bottle-support, a cork-inserter for inserting the cork, mechanism for operating the cork-inserter toward and away from the bottle-support, mechanism for securing strands of wire to the bottle with their extremities projecting therefrom, mechanism for securing a second number of strands to the bottle with their extremities projecting therefrom at an angle with the extremities of the first-secured strands, mechanism for operating the said wire-securing mechanisms toward and away from the said support, and mechanism for securing together the separate projecting strands of wire, and mechanism for conjointly operating the wire-securing mechanism and cork-inserter, substantially as and for the purpose described.

9. The combination of a bottle-support, mechanism for securing strands of wire to the bottle with their extremities projecting therefrom, mechanism for securing a second number of strands of wire to the bottle with their extremities projecting therefrom at an angle with the extremities of the first-secured strands, mechanism for passing the wire over the top of the bottle, and mechanism for securing the wire in said position, with a bottle feed or carrier for feeding the bottles from the first to the latter wire-securing mechanism, and connected mechanism for operating the foregoing parts in due order, substantially as and for the purpose specified.

10. The combination of a bottle-support, mechanism for securing strands of wire to the bottle with their extremities projecting therefrom, mechanism for securing a second number of strands of wire to the bottle with their extremities projecting therefrom at an angle with the extremities of the first-secured strands, mechanism for passing the wire over the top of the bottle, and mechanism for twisting together the projecting extremities of the wire, and a bottle feed or carrier for feeding the bottles from the bottle-support, and the separate mechanisms for securing the wire to the bottle with their extremities projecting therefrom at an angle with each other, to the mechanism for twisting together the extremities of the wire, and connected mechanism for operating the foregoing parts in due order, substantially as and for the purpose set forth.

11. In a wiring-machine, the combination of the following mechanisms, to wit: for securing strands of wire to the bottle with their extremities projecting therefrom, for securing a second number of strands of wire to the bottle with their extremities projecting therefrom at an angle with the extremities of the first-secured strands, said wire-securing mechanism being operated to encircle the bottle, for passing the wire over the top of the bottle and the inserted cork, for securing together the opposite extremities of the wire, and connected mechanism for operating the foregoing parts in due order, substantially as and for the purpose described.

12. The combination of wire-securing jaws or arms arranged at an angle with each other and mechanism for actuating said arms toward and away from the bottle for securing strands of wire to the bottle with their extremities projecting therefrom at an angle with each other, with the following mechanisms, to wit: for turning upward over the top of the bottle and the inserted cork the projecting extremities of the wire and for securing the wire in said position, and connected mechanism for operating the foregoing in due order, substantially as described.

13. The combination of wire-securing jaws or arms arranged at an angle with each other, and mechanism for actuating said jaws toward and away from the bottle for securing thereto strands of wire having their extremities projecting therefrom at an angle with each other, with the following mechanisms, to wit: for turning the projecting extremities of the wire upward over the top of the bottle and the inserted cork and for twisting together said extremities in said position, and connected mechanism for operating the said parts in due order, substantially as set forth.

14. The combination of wire-securing jaws or arms arranged at an angle with each other and mechanism for actuating said arms or jaws toward and away from the bottle for securing strands of wire thereto with their extremities projecting at an angle from the bottle, with the following mechanisms, to wit: for operating the securing-jaws to encircle the bottle, for withdrawing the jaws from said position, for turning upward over the top of the bottle and the inserted cork the projecting extremities of the wire and for securing the wire in said position, and connected mechanism for operating said parts in due order, substantially as specified.

15. The combination of wire-securing jaws or arms arranged at an angle with each other, mechanism for actuating said jaws or arms toward and away from the bottle for securing strands of wire to the bottle with their extremities projecting at an angle therefrom, a cork-compressor timed with with the wire-securing jaws, a cork-inserter, and connected mechanism between the foregoing parts for operating them conjointly, substantially as specified.

16. The combination of wire-securing jaws or arms arranged at an angle with each other, mechanism for actuating said jaws toward and away from the bottle for securing strands of wire thereto with their extremities projecting at an angle therefrom, a compressor, a cork-inserter, a bottle-support, and connected mechanism for conjointly operating the foregoing parts, substantially as described.

17. The combination of a bottle-support, a carrier or feed for feeding the bottle to the bottle-support, wire-securing jaws or arms arranged at an angle with each other, mechanism for operating said jaws toward and away from the bottle for securing strands of wire to the bottle with their extremities at an angle with each other, a cork-compressor, a cork-inserter, and connected mechanism for conjointly operating the foregoing parts, substantially as and for the purpose specified.

18. The combination of wire-securing jaws or arms arranged at an angle with each other, mechanism for operating said jaws toward and away from the bottle for securing strands of wire thereto with their extremities projecting therefrom at an angle with each other, and mechanism for operating said shuttle-jaws lengthwise of the bottle, with the following mechanisms, to wit: for turning upward the projecting extremities of the wire and for securing the wire in said position, and connected mechanism for operating the foregoing parts in due order, substantially as and for the purpose set forth.

19. The combination of shuttles arranged at an angle with each other and having wire-securing jaws or arms for securing strands of wire to the bottle with their extremities projecting therefrom at an angle with each other, with the following mechanisms, to wit: for turning upward over the top of the bottle and the inserted cork the projecting extremities of the wire and for securing the wire in said position, and connected mechanism for operating the foregoing in due order, substantially as and for the purpose described.

20. The combination of shuttles arranged at an angle with each other and having wire-securing jaws or arms for securing strands of wire to the bottle with their extremities projecting therefrom at an angle with each other, a compressor, a cork-inserter, a bottle-support, and connected mechanism for conjointly operating the foregoing parts, substantially as and for the purpose specified.

21. The combination of wire-securing jaws or arms arranged at an angle with each other, mechanism for actuating the said jaws toward and away from the bottle for securing strands of wire thereto with their extremities projecting therefrom at an angle with each other, mechanism for actuating said jaws lengthwise of the bottle, a compressor, and a cork-inserter, with the following mechanisms, to wit: for turning upward the projecting extremities of the wire and for securing the wire in said position, and connected mechanism for conjointly operating the foregoing parts, substantially as and for the purpose described.

22. The combination of shuttles arranged at an angle with each other and having wire-securing arms or jaws for securing strands of wire to the bottle with their extremities projecting therefrom at an angle with each other, a compressor, a bottle-support, mechanism for actuating said shuttles toward and away from said bottle-support, a compressor movable toward and away from said bottle-support, a cork-inserter movable toward and away from said bottle-support, and connected mechanism for conjointly operating said parts, substantially as set forth.

23. The combination of wire-securing jaws or arms arranged in pairs meeting each other at an angle and lying one upon the other, with the following mechanisms, to wit: for operating the said jaws to encircle the top of the bottle, for withdrawing the said jaws from said position, for turning upward the projecting extremities of the wire, and for securing the wire in said position, and connected mechanism between the foregoing parts for operating them in due order, substantially as specified.

24. The combination of shuttle-carriers and yielding shuttle-jaws arranged at an angle with each other for securing strands of wire to the bottle with their extremities projecting therefrom at an angle with each other, with the following mechanisms, to wit: for operating the jaws to encircle the bottle, for automatically withdrawing said yielding jaws around the bottle, for turning upward the projecting extremities of the wire, and for securing the wire in said position, and connected mechanism between the parts to operate them in due order, substantially as described.

25. In a wiring-machine, the combination of wire-securing jaws or arms arranged at an angle with each other for securing strands of wire to the bottle with their extremities projecting therefrom at an angle with each other, with the following mechanisms, to wit: for rotating the shuttle-jaws to twist together the projecting extremities of the wire, for turning upward the projecting extremities over the top of the bottle and the cork, and for securing the wire in said position, and connected mechanism between the parts for operating them in due order, substantially as set forth.

26. The combination of wire-securing jaws arranged at an angle with each other and mechanism for actuating said jaws toward and away from the bottle for securing strands of wire to the bottle, with the following mechanisms, to wit: for rotating the shuttle-jaws to twist together the projecting extremities of the wire, for turning upward over the top of the bottle and the inserted cork the twisted extremities of the wire, and for securing the wire in said position, and connected mechanism between the parts, substantially as specified.

27. In a wiring-machine, the combination of shuttle-jaws arranged at an angle with each other, mechanism for actuating said jaws toward and away from the bottle for securing strands of wire to the bottle with their extremities projecting therefrom at an angle with each other, with the following mechanisms, to wit: for rotating the shuttle-jaws to twist together the projecting extremities of the wire, for stopping the rotation of the shuttle-jaws, for turning upward over the top of the bottle and the inserted cork the projecting extremities of the wire, and for securing the wire in said position, and connected mechanism between the foregoing to operate them in due order, substantially as described.

28. The combination of shuttles arranged at an angle with each other, and wire-securing arms or jaws for securing strands of wire to the bottle with their extremities projecting therefrom at an angle with each other, with the following mechanisms, to wit: for rotating the shuttle-jaws to twist together the projecting extremities of the wire, for stopping the rotation of the shuttle-jaws, for turning upward over the top of the bottle and the inserted cork the projecting extremities of the wire and for securing the wire in said position, and connected mechanism between the foregoing to operate them in due order, substantially as and for the purpose specified.

29. The combination of shuttles arranged at an angle with each other, and wire-securing arms or jaws for securing strands of wire to the bottle with their extremities projecting therefrom at an angle with each other, with the following mechanisms, to wit: for rotating the shuttle-jaws to twist together the projecting extremities of the wire, for turning upward the projecting extremities over the top of the bottle and the inserted cork, and for securing the wire in said position, and connected mechanism between the parts for operating the same in due order, substantially as and for the purpose set forth.

30. In a wiring-machine, the combination of shuttle-carriers having shuttle-jaws and arranged at an angle with each other for securing strands of wire to the bottle with their extremities projecting therefrom at an angle with each other, with the following mechanisms, to wit: for rotating the shuttle-jaws to twist together the projecting extremities of the wire, for stopping the rotation of the shuttle-jaws when the same are in a horizontal plane, for turning upward over the top of the bottle and the inserted cork the projecting extremities of the wire and for securing the wire in said position, and connected mechanism between the parts for operating them in due order, substantially as specified.

31. In a wiring-machine, the combination of shuttle-carriers and shuttle-jaws arranged at an angle with each other for securing strands of wire to the bottle with their extremities projecting therefrom at an angle with each other, with the following mechanisms, to wit: for operating the shuttle-jaws to encircle the bottle, for withdrawing the jaws from said position, for rotating said jaws immediately after their withdrawal from the bottle, for turning upward over the top of the bottle and the inserted cork the twisted extremities of the wire and for securing the wire in said position, and connected mechanism for operating the foregoing in due order, substantially as and for the purpose described.

32. In a wiring-machine, the combination of the following mechanisms, to wit: for securing strands of wire to the bottle with their extremities projecting, for securing a second number of strands to the bottle with their extremities projecting at different points from the extremities from the first-secured strands of wire, for twisting together with a tight twist the portion of said strands adjacent to said bottle, for twisting together with a looser twist the portion of said strands adjacent to said tight twists, for turning upward over the top of the bottle and the inserted cork the projecting extremities of the wire and for securing the wire in said position, and connected mechanism between the foregoing parts to operate them in due order, substantially as and for the purpose set forth.

33. In a wiring-machine, the combination of wire-securing jaws arranged at an angle with each other for securing strands of wire to the bottle with their extremities projecting therefrom at an angle with each other, with the following mechanisms, to wit: for operating said jaws toward and away from the bottle, for rotating said jaws to twist the wire during the operation of the withdrawing mechanism, said withdrawing mechanism operating slowly at the commencement of its motion and quickly at the end thereof, for turning upward the projecting extremities of the wire, and for securing the wire in said position, substantially as and for the purpose specified.

34. In a wiring-machine, the combination of wire-securing jaws arranged at an angle with each other for securing strands of wire to the bottle with their extremities projecting therefrom at an angle with each other, with the following mechanisms, to wit: for forcing said jaws toward the bottle, for withdrawing said jaws to feed out the wire, for rotating said jaws to twist the wire, said rotating mechanism operating after the stoppage of the withdrawing mechanism, for turning upward the projecting extremities of the wire and for securing the wire in said position, and connected mechanism between the parts to operate them in due order, substantially as and for the purpose described.

35. In a wiring-machine, the combination of wire-securing jaws arranged at an angle with each other for securing strands of wire to the bottle with their extremities projecting therefrom at an angle with each other, with the following mechanisms, to wit: for operating said jaws to encircle the bottle, for withdrawing said securing-jaws from around the bottle to feed out the wire, for rotating said jaws after their withdrawal around the bottle, for slowly retracting the jaws during the first part of their rotation, and for then accelerating the retracting motion of said jaws, for elevating the projecting extremities over the top of the bottle and for securing the wire in said position, and connected mechanism between the foregoing parts, substantially as and for the purpose set forth.

36. In a wiring-machine, the combination of wire-securing jaws arranged at an angle with each other for securing strands of wire to the bottle with their extremities projecting therefrom at an angle with each other, with the following mechanisms, to wit: for operating said jaws to encircle the bottle, for operating said jaws lengthwise of the bottle, for withdrawing said jaws from around the bottle, for rotating the jaws after their withdrawal from around the bottle, for stopping the withdrawal of the jaws before the stoppage of their rotation, for elevating the projecting extremities over the top of the bottle and the cork and for securing the wire in said position, and connected mechanism between the parts, substantially as and for the purpose described.

37. In a wiring-machine, the combination, with wire-securing jaws for securing strands of wire to the bottle and over the top of the inserted cork, of the following mechanisms, to wit: for operating the shuttle-jaws to encircle the bottle, for withdrawing the shuttle-jaws around the bottle, for rotating said jaws after their withdrawal around the bottle, for slowly retracting the jaws during the first part of their twisting and then more quickly retracting them, for cutting off the wire secured to the bottle from that secured to the shuttle-jaws, for turning the projecting extremities of the wire over the top of the bottle and the inserted cork and for securing the wire in said position, and connected mechanism between the foregoing parts, substantially as and for the purpose specified.

38. In a wiring-machine, the combination, with wire-securing jaws arranged at an angle with each other and mechanism for operating said jaws toward and away from the bottle for securing strands of wire thereto with their extremities projecting therefrom at an angle with each other, of the following mechanisms, to wit: for cutting off the several projecting extremities of the wire from the shuttle-jaws, for turning the projecting extremities of the wire upward over the top of the bottle and the inserted cork and for securing the wire in said position, and connected mechanism between the parts, substantially as and for the purpose set forth.

39. In a wiring-machine, the combination, with wire-securing jaws arranged at an angle with each other for securing strands of wire to the bottle with their extremities projecting therefrom at an angle with each other, of the following mechanisms, to wit: for cutting off the several projecting extremities of the wire from the shuttle-jaws, for holding the wire during the operation of the wire-cutting mechanism, for turning upward over the top of the bottle and the inserted cork the projecting extremities of the wire, and for securing the wire in said position, substantially as and for the purpose specified.

40. In a wiring-machine, the combination of the following mechanisms, to wit: for securing strands of wire to the bottle with their extremities projecting therefrom, for twisting together with a tight twist the portion of the projecting extremities adjacent to the bottle, for twisting together said projecting extremities with a looser twist immediately adjacent to the tight twist, for twisting together said extremities with a tight twist immediately adjacent to said loose twist, for cutting the wires substantially midway between the tight twists, for turning over the top of the bottle and the inserted cork the projecting twisted extremities of the wire, and for securing the wire in said position, substantially as and for the purpose described.

41. In a wiring-machine, the combination of wire-securing jaws approximated toward each other with a yielding pressure, with the following mechanisms, to wit: for registering said jaws with the bottle, for withdrawing said jaws away from the bottle to feed out the wire, for rotating said jaws to twist together the projecting extremities of the wire, said withdrawing mechanism operating slower at the commencement and end of its movement than at the central part thereof, for causing the rotating mechanism to twist together the wire with tighter twists at the points adjacent to the bottle and the said jaws, for cutting off the wire at a point between said tight twists, for turning upward over the top of the bottle and the inserted cork the projecting extremities of the wire, and for securing the wire in said position, substantially as set forth.

42. In a wiring-machine, the combination of wire-securing jaws arranged at an angle with each other, with the following mechanisms, to wit: for forcing said jaws toward the bottle, for withdrawing the jaws to secure the strands of wire to the bottle with their extremities projecting therefrom, for twisting together with a tight twist the portion of said projecting extremities adjacent to the bottle, for twisting together with a looser twist the portion of said extremities adjacent to said tight twist, for twisting together with a tight twist the portion of said extremities adjacent to the loose twist, for cutting the wire substantially midway between the tight twists, for turning upward over the top of the bottle and the inserted cork the projecting extremities of the wire, and for securing the wire in said position, substantially as and for the purpose described.

43. In a wiring-machine, the combination, with wire-securing jaws arranged at an angle with each other, of the following mechanisms, to wit: for forcing said jaws toward the bottle, for withdrawing the jaws to secure the strands of wire to the bottle with their extremities projecting therefrom, for twisting together with a tight twist the portion of said projecting extremities adjacent to the bottle, for twisting together with a looser twist the portion of said extremities adjacent to said tight twist, for twisting together with a tight twist the portion of said extremities adjacent to the loose twist, for cutting the projecting extremities of the wire at the portion interposed between the tight twists, said cutting mechanism being interposed between the lines of motion of the shuttle-jaws and movable toward and away from the said lines of motion, for turning upward over the top of the bottle and the inserted cork the twisted extremities of the wire, and for securing the wire in said position, substantially as and for the purpose set forth.

44. The combination, with mechanism for securing the wire to the bottle and over the top of the inserted cork, of a compressor for capping over the top of the bottle and compressing the cork, and a cork-inserter for inserting the cork, and connected mechanism for operating the foregoing parts conjointly, substantially as and for the purpose described.

45. The combination of the following wire-securing mechanisms, to wit: for securing strands of wire to the bottle with their extremities projecting and for securing a second number of strands to the bottle with their extremities projecting at an angle with the extremities of the first-secured strands, with a compressor for capping over the top of the bottle and compressing the cork, a cork-inserter for inserting the cork, mechanism for turning the projecting extremities of the wire upward over the top of the bottle and the inserted cork, and mechanism for securing the wire in said position, and connected mechanism for conjointly operating the parts in due order, substantially as described.

46. The combination of wire-securing mechanism movable toward and away from the bottle for securing the wire thereto and over the top of the bottle and the inserted cork, a compressor for capping over the bottle and supporting the same during the operation of the wire-securing mechanism, a cork-inserter for inserting the cork, and mechanism for conjointly operating the foregoing parts, substantially as and for the purpose specified.

47. The combination of wire-securing jaws arranged at an angle with each other, mechanism for forcing said jaws toward and away from the bottle for securing strands of wire thereto with their extremities projecting therefrom at an angle with each other, with the following mechanisms, to wit: for turning the projecting extremities over the top of the bottle and cork, for securing the wire in said position, an adjustable support, a cork-inserter for inserting the cork into the bottle, and connected mechanism for conjointly operating the foregoing parts, substantially as and for the purpose set forth.

48. The combination, with mechanism for securing the wire to the bottle and over the top of the inserted cork, of a compressor for capping over the top of the bottle and compressing the cork, a cork-inserter for inserting the cork, an adjustable bottle-support, mechanism for moving said support toward the bottle after the capping thereof by the compressor, and mechanism for moving said support downward after the operation of said cork-inserter, and connected mechanism for conjointly operating the foregoing parts, substantially as set forth.

49. The combination, with mechanism for securing the wire to the bottle and over the top of the inserted cork, of a compressor for compressing the moist cork, exit-openings in said compressor to allow of the egress of moisture contained in the cork, a cork-inserter, and connected mechanism between the foregoing parts to operate them conjointly, substantially as described.

50. The combination, with wire-securing jaws or arms arranged at an angle with each other for securing strands of wire to the bottle with their extremities projecting therefrom at an angle with each other, mechanism for turning the wire over the top of the bottle and the inserted cork, and mechanism for securing the wire in said position, of a compressor for compressing the cork from the bottom upward, a cork-inserter for inserting the cork into the bottle, and connected mechanism between the cork compressor and inserter and the different wiring mechanisms for conjointly operating the foregoing parts to cork the bottle and wire the cork thereto, substantially as specified.

51. The combination of mechanisms for securing strands of wire to the bottle with their extremities projecting therefrom, for turning upward the projecting extremities of the wire over the top of the bottle and the inserted cork, and for securing the wire in said position, with a cork-inserter and a cork-feed for feeding the corks, and connected mechanism between the foregoing parts to operate them conjointly, substantially as and for the purpose specified.

52. The combination of mechanism for securing the wire to the bottle and over the top of the inserted cork, a cork-compressor, a cork-feed for feeding corks to the cork-compressor, and a cork-inserter for inserting the corks, and connected mechanism between the foregoing parts to operate them conjointly, substantially as specified.

53. The combination of mechanism for securing the wire to the bottle with its extremities projecting therefrom, for turning upward the projecting extremities of the wire over the top of the bottle and the inserted cork, and for securing the wire in said position, with a cork-inserter, a cork-feed for feeding the corks to the cork-inserter, and a cut-off for feeding the corks one by one to said cork-inserter, and connected mechanism between the parts for operating them conjointly, substantially as and for the purpose described.

54. The combination of mechanism for securing the wire to the bottle and over the top of the cork, a cork-compressor for compressing the corks, a cork-feed for feeding the corks to the cork-compressor, a cut-off for feeding the corks one by one to said compressor, a cork-inserter for inserting the corks, and connected mechanism for conjointly operating the foregoing parts, substantially as and for the purpose set forth.

55. The combination of mechanism for securing the wire to the bottle and over the top of the cork, a cork-compressor for compressing the corks, a cork-feed for feeding the corks, a cut-off for feeding the corks one by one to the compressor, said cut-off being operated by the movement of the compressor or its actuating mechanism, and a cork-inserter for inserting the corks, and connected mechanism between the foregoing parts to operate them conjointly, substantially as specified.

In testimony whereof we have hereunto signed our names, in the presence of two attesting witnesses, at Rochester, in the county of Monroe, in the State of New York, this 23d day of May, 1889.

SOL. WILE.
     HENRY LACASSE.

Witnesses:
 A. E. PARSONS,
 FRANK M. GOFF.